US012495805B2

(12) United States Patent
Maestas

(10) Patent No.: US 12,495,805 B2
(45) Date of Patent: Dec. 16, 2025

(54) METHOD AND SYSTEM FOR HUMANELY DISPATCHING WOUNDED GAME

(71) Applicant: David Maestas, Los Lunas, NM (US)

(72) Inventor: David Maestas, Los Lunas, NM (US)

(*) Notice: Subject to any disclaimer, the term of this patent is extended or adjusted under 35 U.S.C. 154(b) by 149 days.

(21) Appl. No.: 18/103,909

(22) Filed: Jan. 31, 2023

(65) Prior Publication Data

US 2023/0172215 A1 Jun. 8, 2023

Related U.S. Application Data

(60) Continuation-in-part of application No. 16/857,059, filed on Apr. 23, 2020, now Pat. No. 11,570,996, which is a continuation of application No. 16/694,916, filed on Nov. 25, 2019, now Pat. No. 10,667,529, which is a continuation of application No. 15/424,286, filed on Feb. 3, 2017, now Pat. No. 10,524,480, which is a continuation-in-part of application No. 15/139,417, filed on Apr. 27, 2016, now Pat. No. 9,585,404, which is a division of application No. 14/060,359, filed on Oct. 22, 2013, now Pat. No. 9,374,994.

(51) Int. Cl.

| | |
|---|---|
| ***A22B 3/00*** | (2006.01) |
| ***A22B 3/08*** | (2006.01) |
| ***A22B 3/10*** | (2006.01) |
| ***B25B 13/50*** | (2006.01) |
| ***F41A 21/40*** | (2006.01) |
| *A01M 31/00* | (2006.01) |

(52) U.S. Cl.
CPC .................. *A22B 3/10* (2013.01); *A22B 3/08* (2013.01); *B25B 13/5083* (2013.01); *F41A 21/40* (2013.01); *A01M 31/00* (2013.01)

(58) Field of Classification Search
CPC ............. A22B 3/08; A22B 3/10; A01M 31/00
USPC .......................................... 452/102–105, 174
See application file for complete search history.

(56) References Cited

U.S. PATENT DOCUMENTS

| | | | | |
|---|---|---|---|---|
| 1,503,372 | A | 7/1924 | Pacholke | |
| 1,580,790 | A | 4/1926 | MacAllister | |
| 2,081,229 | A | 5/1937 | Fisher et al. | |
| 2,434,587 | A | 1/1948 | Riordan | |
| 2,505,705 | A * | 4/1950 | Cohn | B26B 13/16 D8/57 |
| 2,884,972 | A * | 5/1959 | Harris | B25B 15/04 81/177.1 |
| 3,991,466 | A | 11/1976 | Smith | |
| 4,089,113 | A * | 5/1978 | Moritz | B26B 13/00 D8/57 |
| 4,127,919 | A | 12/1978 | Buddecke | |
| 4,551,886 | A | 11/1985 | Couche et al. | |
| 4,553,287 | A | 11/1985 | DeSordi et al. | |

(Continued)

FOREIGN PATENT DOCUMENTS

WO WO-9624303 A1 * 8/1996 ..... A61B 17/320016

*Primary Examiner* — Richard T Price, Jr.
(74) *Attorney, Agent, or Firm* — LOZA & LOZA, LLP; Kevin L. Soules

(57) ABSTRACT

A method, system, and apparatus for humanely dispatching wounded game in the field comprises a shank with a connecting end, a curved region, and a pointed end connected to a grip formed at the connecting end of the shank, and a finger loop. The grip can further comprise a series or flattened portions configured to engage the gaps in a choke tube in order to remove the choke tube.

10 Claims, 21 Drawing Sheets

(56) References Cited

U.S. PATENT DOCUMENTS

| | | | | | |
|---|---|---|---|---|---|
| 4,601,102 | A | | 7/1986 | Philips | |
| 4,742,617 | A | * | 5/1988 | Gauvry | B26B 13/20<br>30/232 |
| 4,926,554 | A | * | 5/1990 | Martin | B26B 1/048<br>30/331 |
| 5,290,186 | A | | 3/1994 | Juranitch | |
| 5,613,904 | A | | 3/1997 | LaSalle et al. | |
| D387,631 | S | | 12/1997 | Thibault | |
| 6,001,120 | A | * | 12/1999 | Levin | A61B 17/295<br>606/189 |
| 6,183,356 | B1 | | 2/2001 | Middleton et al. | |
| 6,328,494 | B1 | * | 12/2001 | Moxon | B43K 8/003<br>206/374 |
| 6,450,871 | B1 | | 9/2002 | Morrison, Jr. et al. | |
| 6,968,644 | B1 | * | 11/2005 | Garcia | A01K 97/18<br>606/205 |
| 7,024,777 | B1 | | 4/2006 | Bach | |
| 7,125,329 | B2 | | 10/2006 | Mindes | |
| 7,402,099 | B1 | | 7/2008 | Parvin | |
| D574,676 | S | | 8/2008 | LaDelfa | |
| 7,578,731 | B1 | | 8/2009 | Moore | |
| 7,966,733 | B2 | * | 6/2011 | Jun | B26B 13/20<br>30/232 |
| 8,308,534 | B1 | | 11/2012 | Amesbury | |
| 9,119,404 | B2 | | 9/2015 | Rotello | |
| 9,888,698 | B1 | | 2/2018 | Morsell et al. | |
| 2013/0023190 | A1 | | 1/2013 | Evans | |
| 2013/0192005 | A1 | | 8/2013 | Christenson | |
| 2015/0257604 | A1 | * | 9/2015 | Heyden | B26B 29/02<br>30/120.1 |

* cited by examiner

METHOD AND SYSTEM FOR HUMANELY DISPATCHING WOUNDED GAME

CROSS-REFERENCE TO RELATED APPLICATIONS

This Application is a Continuation in Part of U.S. application Ser. No. 16/857,059, entitled "Method and System for Humanely Dispatching Wounded Game," filed Apr. 23, 2020. U.S. application Ser. No. 16/857,059 is a Continuation of U.S. application Ser. No. 16/694,916 entitled "Method and System for Humanely Dispatching Wounded Game," filed on Nov. 25, 2019, which is a Continuation of U.S. application Ser. No. 15/424,286 entitled "Method and System for Humanely Dispatching Wounded Game," filed on Feb. 3, 2017, which is a Continuation in Part of U.S. application Ser. No. 15/139,417, entitled "Method and System for Humanely Dispatching Wounded Game," filed on Apr. 27, 2016. application Ser. No. 15/139,417 is a divisional of U.S. application Ser. No. 14/060,359, entitled "Method and System for Humanely Dispatching Wounded Game," filed on Oct. 22, 2013. application Ser. No. 16/857,059, application Ser. No. 16/694,916, application Ser. No. 15/424,286, application Ser. No. 15/139,417, and application Ser. No. 14/060,359 are all incorporated herein by reference in their entirety.

TECHNICAL FIELD

Embodiments are generally related to the field of hunting tools. More particularly, embodiments relate to methods and systems for humanely dispatching game wounded in the field.

Embodiments are further related to tools for inserting or removing choke tubes.

Embodiments are also directed to tools for opening bottles.

Embodiments are further directed to tools for removing jammed cartridges from firearms.

Embodiments are thus directed to multifunction tools for dispatching wounded game, inserting or removing choke tubes, opening bottles, and removing jammed cartridges from firearms.

BACKGROUND OF THE INVENTION

It is common for a hunter's first attempt to bag game to result in the mortal wounding of the game without causing its immediate death. This is particularly true when hunting upland game, waterfowl, and other such game where a shotgun is the primary weapon. In such cases, the game is often struck by a sufficient number of pellets to ensure its ultimate demise. However, the bird is often wounded, but alive when the hunter arrives to retrieve the game. Thus, it would be advantageous and more humane to have a tool for quickly dispatching wounded game once it is retrieved.

Prior art methods for dispatching fowl are commonly centered on crushing the bird's head with a vice, pliers, or other such device. However, such devices are archaic, cause the wounded game unnecessary pain, can cause an unwanted mess, and can be difficult to carry in the field. Therefore, a need exists for a portable, humane, tool for dispatching fowl that can be easily taken into the field.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a tool.

It is another aspect of the disclosed embodiments to provide for an enhanced method, apparatus, and system for dispatching wounded game.

It is another aspect of the disclosed embodiments to provide an enhanced apparatus, method, and system for a portable tool for quickly and humanely dispatching wounded game in the field.

It is yet another aspect of the disclosed embodiment to provide a multi-purpose tool for removing and inserting choke tubes in a firearm.

It is another aspect of the disclosed embodiments to provide a portable tool for opening bottles.

It is another aspect of the disclosed embodiments to provide an apparatus, method, and system for a portable tool for removing jammed cartridges from a firearm.

It is an additional aspect of the disclosed embodiments to provide an enhanced apparatus, method, and system for a portable multifunctional tool for quickly and humanely dispatching wounded game in the field, removing and/or inserting choke tubes in firearms, opening bottles, and removing jammed cartridges from a firearm.

The aforementioned aspects and other objectives and advantages can now be achieved as described herein. An apparatus comprising a shank with a connecting end, a curved region, and a pointed end is connected to a grip formed at the connecting end of the shank. The grip can include a lip formed along the forward edge of the front side. The grip is connected to a finger ring. The apparatus, and specifically the curved region in the shank, is configured to allow the pointed end of the shank to penetrate a target below the target's skull and, upon continued insertion, penetrate the brain/brain stem of said target thereby humanely dispatching the target.

In other embodiments, the apparatus and system can include a choke wrench formed on the grip that provides a convenient means for removing and inserting choke tubes in a firearm.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
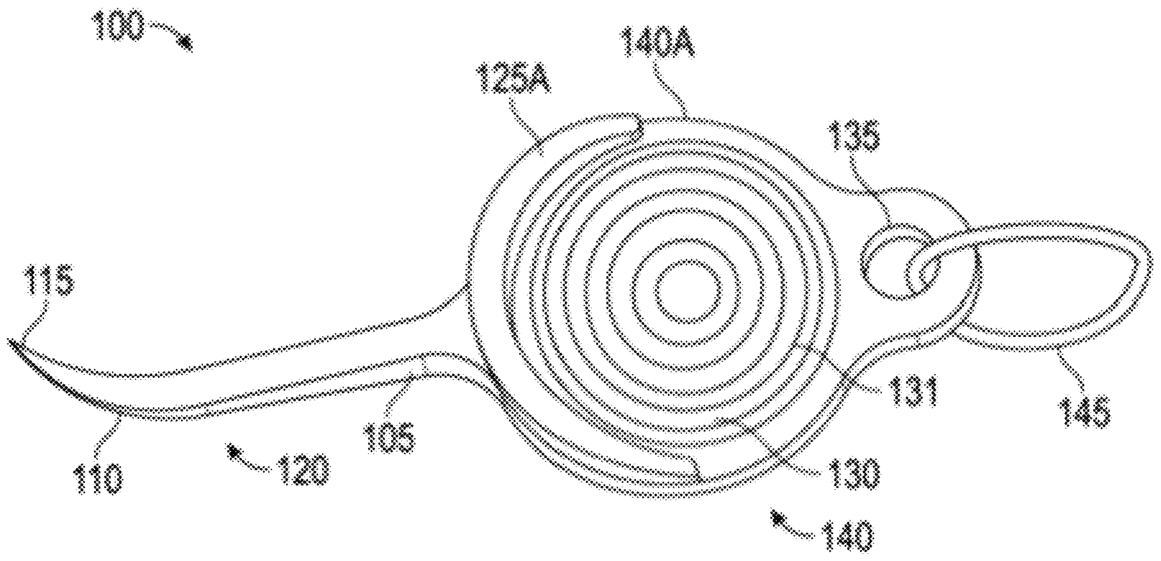
FIG. 1 depicts a tool for dispatching wounded game in the field.
Figure 1A:
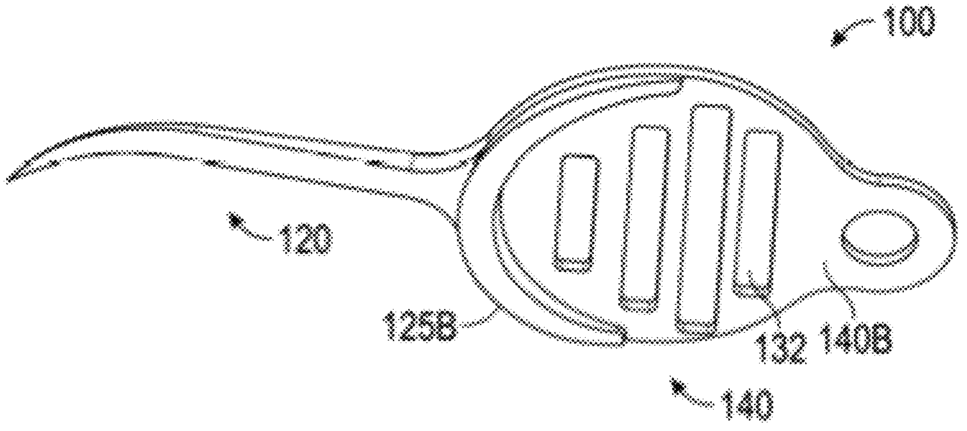
FIG. 1A depicts a reverse side of a tool for dispatching wounded game in the field.

FIG. 1 and FIG. 1A illustrate a portable tool 100 for humanely dispatching wounded game. Hunting enthusiasts commonly encounter a situation where a target is wounded. Such situations require the hunter to quickly dispatch the wounded game. However, traditionally, the game is killed manually or by using tools that crush the targets skull. These methods are unsatisfactory because they are often messy and cause significant damage to the animal's carcass. Such destruction is not desirable if the target is to be used, for example, in dog training where a headless body is not useful. Likewise, the hunter may wish to preserve the entire body intact for various other reasons.

Tool 100 fills this need by providing a portable utility that can be carried into the field to quickly dispatch wounded game. Tool 100 includes a shank 120. Shank 120 is formed with a pointed end 115 that is configured to pierce the wounded game on the back of the head, just below the skull. Shank 120 includes a curved region 110 and a connecting end 105.

The curved region 110 of shank 120 is specifically configured so that after the pointed end 115 is inserted below the skull, the continued insertion of the shank 120 drives the pointed end 115 upward into the wounded game's brain and/or brain stem, thereby quickly and humanely dispatching the target. Thus, the angle of curved region 110 is critical. The angle of curved region 110 is preferably between 20 and 80 degrees, and may be selected to suit a specific target. For example, a more dramatic angle may be required for game with a larger head, longer neck, or other such anatomical feature. The angle of curved region 110 can therefore be selected to match the anatomy of the game the hunter is hunting.

Shank 120 can be formed with a tapered rectangular shape. Shank 120 is tapered so that pointed end 115 terminates in a sharp point. Alternatively, shank 120 can be formed with a tapered tubular shape as shown in FIGS. 3A-3G below.

Figure 2:
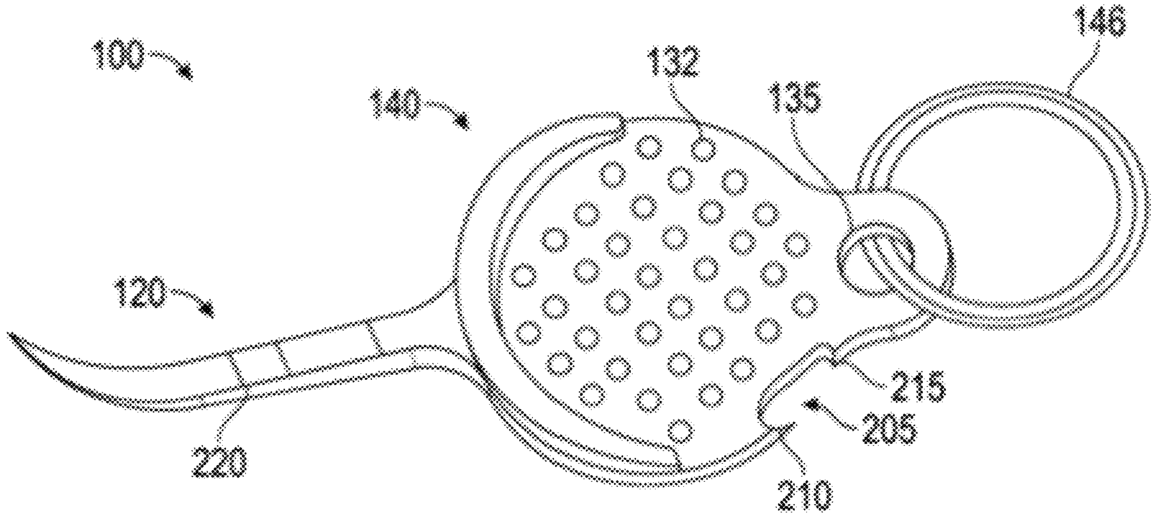
FIG. 2 depicts an alternative embodiment of an apparatus and system for dispatching wounded game in the field.

In a preferred embodiment, shank 120 is formed from a plastic polymer, wood, aluminum, or other metal, or a combination thereof. It should be appreciated that the tool can be used in conjunction with game fowl, dove, quail, ducks, geese, snipe, pigeon, chickens, turkey, fish, and other species of game. In addition, the length of the shank and the size of the grip may be altered to fit the specific anatomy of the game upon which the tool is intended to be used. This may include providing markings on a "one size fits all" version of the shank 120 that indicates to the user roughly how deep the shank 120 needs to be inserted in order to effectively reach the brain/brain stem of a variety of different game animals. Such markings are shown in FIG. 2 as markings 220. Markings 220 can be color coded and/or labeled to identify the game species the mark is associated with. This provides the user a metric for how deep the tool should be inserted for that species.

Connecting end 105 of the shank 120 is connected to grip 140. Grip 140 is intended to be grasped between the thumb and index fingers. Grip 140 includes a front surface 140A and rear surface 140B (shown in FIG. 1A of the reverse side of tool 100). The front side of front surface 140A includes a lip 125A and the front side of rear surface 140B includes lip 1258. Lips 125A and 1258 prevent the user's fingers from slipping off the grip 140. Grip 140 also includes a hole 135 formed to accept a retaining device 145, such as a lanyard or key chain ring. This allows a user to easily connect tool 100 to a belt, boot, gun, backpack, or other clothing article via the retaining device 145 so that the tool 100 can be easily carried into the field. In an alternative embodiment, retaining device 145 can have an elastic property or otherwise be configured with a retractable cord so that the tool 100 can be pulled away from the user for use in the field without being removed from its connection to the user when it is used.

Grip 140 can be comprised of a sub-structure such as a plastic polymer, wood, metal such as aluminum, or the like, with a rubber coating 130 formed over the sub-structure. The grip 140 can include a plurality of ridges comprising parallel raised ridges 132, parallel sunken ridges, concentrically raised rings 131, dimples, or the like to promote a user's grip and prevent slippage. It should be appreciated that any combination of ridges, rings, dimples, or the like can be included on the front surface 140A and/or rear surface 140B, so as to best facilitate the user's grip.

FIG. 2 illustrates an alternative embodiment of tool 100. It should be noted that equivalent or similar features throughout the figures are labeled with the same reference numerals. In the preferred embodiment illustrated in FIG. 2, tool 100 includes a plurality of raised dimples 132 to prevent a user's fingers from slipping off of grip 140. Furthermore, in an alternative embodiment, grip 140 can further include a bottle opener, which comprises a cutout 205 in the back of grip 140 with a flat side 215 and a lip 210. FIG. 2 also illustrates a further alternative embodiment wherein a key ring 146 is connected to hole 135 of the tool 100.

Figure 3A:
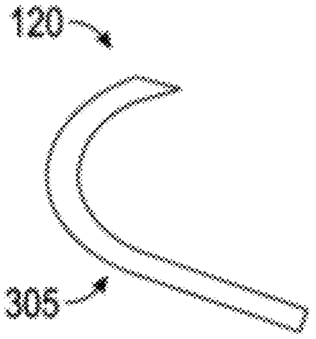
FIG. 3A depicts an exploded view of a pointed end comprising a hook associated with a tool for dispatching wounded game in the field in accordance with an alternative embodiment.
Figure 3B:
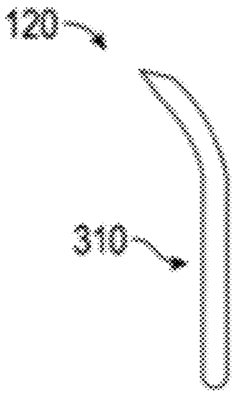
FIG. 3B depicts an exploded view of a pointed end comprising a left twist associated with a tool for dispatching wounded game in the field in accordance with an alternative embodiment.
Figure 3C:
FIG. 3C depicts an exploded view of a pointed end comprising a right twist associated with a tool for dispatching wounded game in the field in accordance with an alternative embodiment.
Figure 3D:
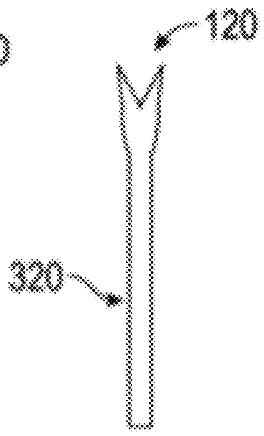
FIG. 3D depicts an exploded view of a pointed end comprising a split-v tip associated with a tool for dispatching wounded game in the field in accordance with an alternative embodiment.
Figure 3E:
FIG. 3E depicts an exploded view of a pointed end comprising a straight tip associated with a tool for dispatching wounded game in the field in accordance with an alternative embodiment.
Figure 3F:
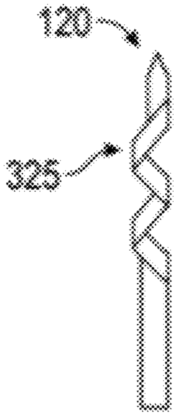
FIG. 3F depicts an exploded view of a pointed end comprising a spiral tip associated with a tool for dispatching wounded game in the field in accordance with an alternative embodiment.
Figure 3G:
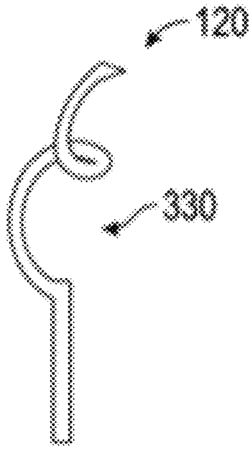
FIG. 3G depicts an exploded view of a pointed end comprising a loose corkscrew tip associated with a tool for dispatching wounded game in the field in accordance with an alternative embodiment.

FIGS. 3A-3G illustrate a set of shanks 120 each of which can be used in accordance with an alternative embodiment of the invention. For example, FIG. 3A illustrates a hook curved region 305 of a shank 120. Likewise, FIG. 3B shows a left twisted curved region 310 of a shank 120. FIG. 3C shows a right twisted curved region 315 of shank 120. FIG. 3D illustrates an alternative embodiment wherein shank 120 includes a v-split pointed end 320. The v-split illustrated in FIG. 3D may be sharp so that as the v-split point end 320 encounters obstructions within the target, it is capable of cutting or severing such obstructions (such as, for example, the target's brain or brainstem, spinal cord, etc.) further aiding in the humane and immediate death of the target. FIG. 3E illustrates a straight shank 120. FIG. 3F displays a spiraled region 325 of shank 120. It should be appreciated with respect to spiraled region 325 that this spiral could be advantageously included in a curved shank such as curved region 110 as shown in FIG. 1. Finally, FIG. 3G illustrates a loose corkscrew region 330 of a shank 120.

It should be appreciated that while FIGS. 3A-3G illustrate a shank embodied as tubular and/or tapered, such shanks could further be configured with a tapered and/or rectangular shaped shank, as shown in FIG. 1. Furthermore, each of FIGS. 3A-3G could alternatively be used as shank 120.

Figure 4:
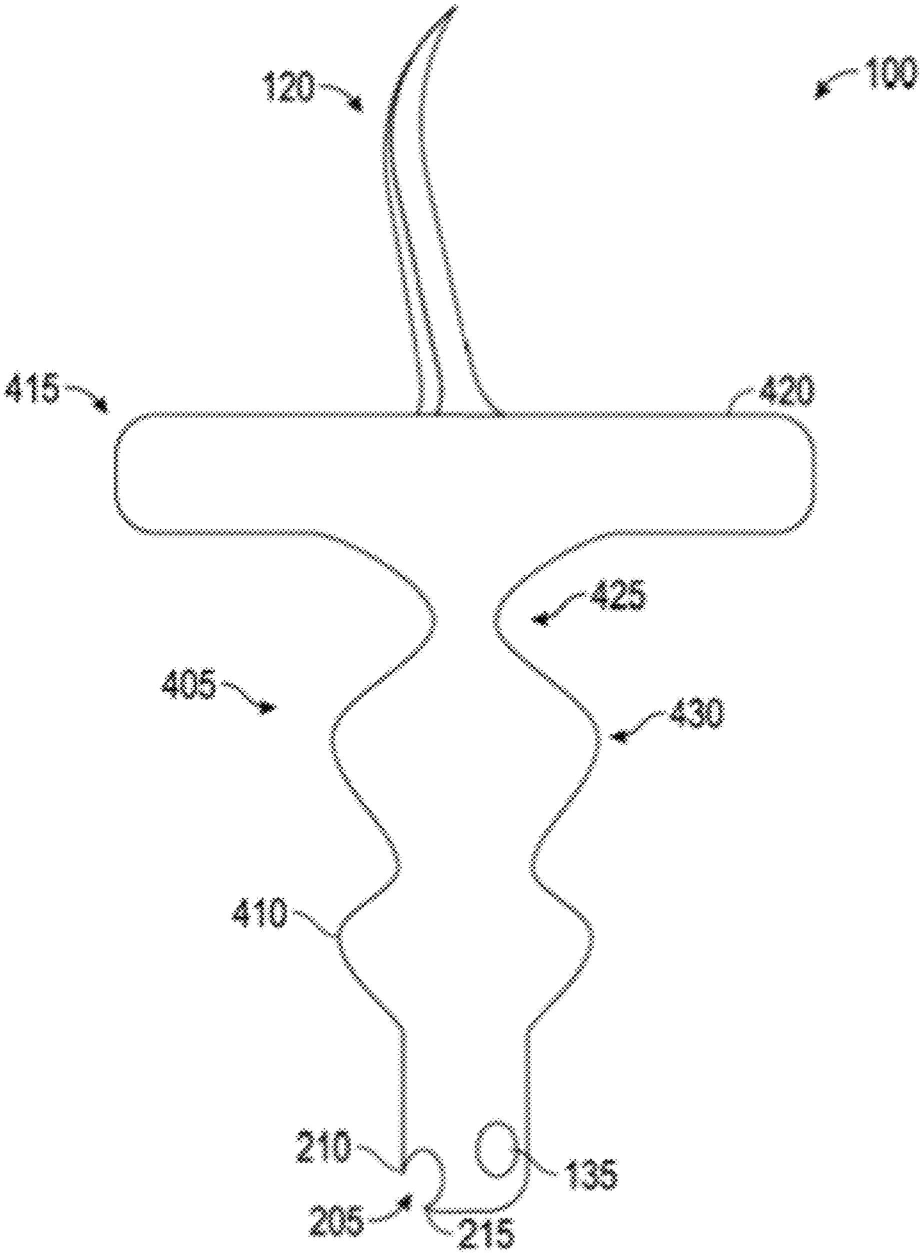
FIG. 4 depicts an exploded view of an alternative grip associated with a tool for dispatching wounded game in the field in accordance with an alternative embodiment.

FIG. 4 illustrates an alternative embodiment of the tool 100. In this embodiment, grip 140 is replaced with a handle 405. Handle 405 is included to be grasped by a wrapping one's fingers around finger grip region 410. Grip 140 includes a finger guard 415, comprising a lateral member 420 affixed to shank 120 such that the lateral member shields the user's fingers and hand from the target.

Finger grip region 410 is configured to fit users' fingers with a series of indentions 425 and protrusions 430 intended to provide the user a comfortable and ergonomic grip of handle 405.

It should be appreciated that tool 100 illustrated in FIG. 4 could be advantageously arranged with any of the shanks 120 illustrated in FIGS. 3A-3G. Furthermore, handle 405 shown in FIG. 4 can include a hole 135 formed to accept a retaining device such as retaining device 145 shown in FIG. 1. This allows a user to easily connect tool 100 to a belt, boot, gun, backpack, or other clothing article via the retaining device 145 so that the tool 100 can be easily carried into the field.

Handle 405 can be comprised of a sub-structure such as a plastic polymer, metal, or the like with a rubber coating, such as coating 130 shown in FIG. 1, formed over the sub-structure. The grip 140 can include a plurality of ridges, dimples, or the like to promote a user's grip and prevent slippage. Furthermore, in an alternative embodiment, handle 405 can include a bottle opener which comprises a cutout 205 at the end of handle 405 with a flat side 215 and a lip 210.

Figure 5:
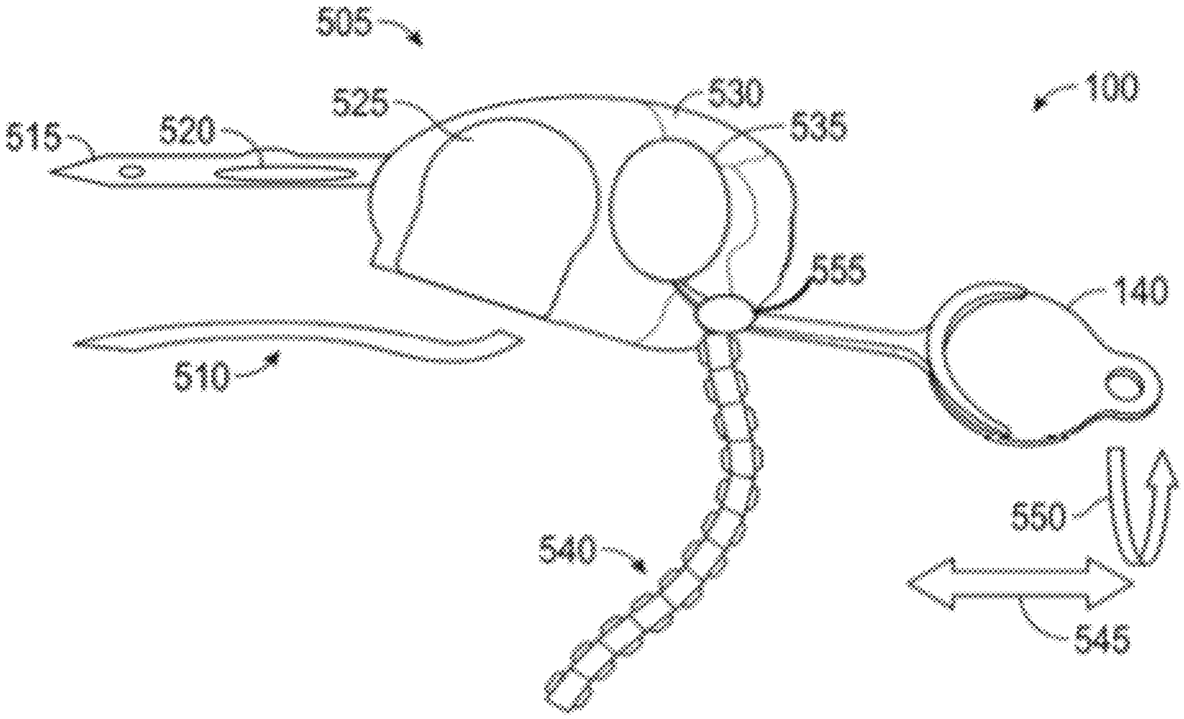
FIG. 5 depicts a tool being used to dispatch wounded game in the field in accordance with an alternative embodiment.

FIG. 5 illustrates the tool 100 inserted in the brain and/or brain stem 535 of a target 505 in accordance with another alternative embodiment. FIG. 5 illustrates an embodiment wherein tool 100 is being used to humanly dispatch game fowl. However, it should be appreciated that tool 100 may also be used to dispatch a target including a large variety of game including small mammals, fish, amphibians, and birds. In general, target 505 may have an anatomy comprising an upper beak 515, lower beak 510, nasal orifice 520, orbital region 525, brain case 530, brain/brainstem 535, and vertebrae 540.

Generally, grip 140 of tool 100 can be maneuvered laterally as shown by arrow 545. Maneuvering grip 140 causes shank 120 to enter the target below the skull at 555 and then penetrate the target's brain/brainstem 535 with pointed end 115. It should be appreciated that the curved region 110 of tool 100 allows the lateral movement of the grip 140 to impart a lateral movement in shank 120 that is translated into an upward motion of pointed end 115, thus penetrating the brain/brain stem from below, without requiring the targets head to be crushed. Once pointed end 115 penetrates the target's brain 535, the target is quickly and humanely dispatched.

Grip 140 and tool 100 can also be moved rotationally as shown by arrow 550, during or after the tool 100 has been inserted into the target. Rotational motion 550 can help incur catastrophic damage to the targets brain/brainstem 535 to ensure the target is swiftly and humanely dispatched.

Figure 6:
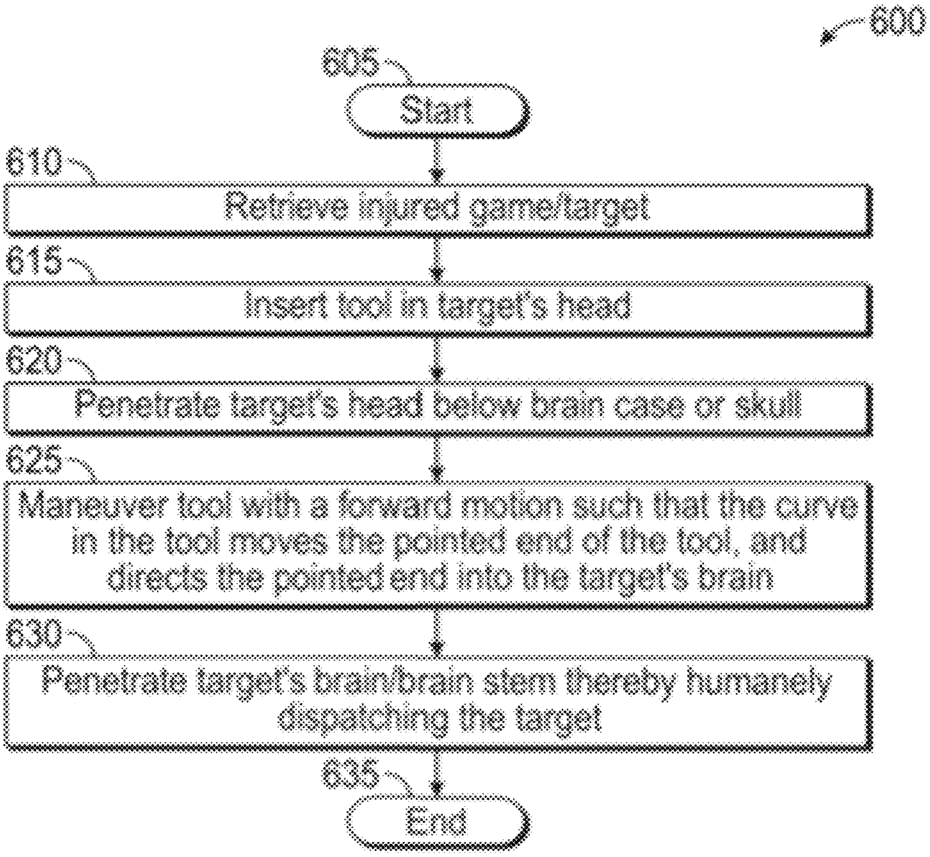
FIG. 6 depicts a flow chart depicting logical operational steps associated with a method of dispatching wounded game in the field in accordance with an alternative embodiment.

FIG. 6 illustrates a set of logical operational steps 600 for quickly and humanly dispatching game in the filed using a tool such as tool 100 shown above. The method starts at step 605.

At step 610, the hunter retrieves game that has been wounded in the field. The tool 100 is then inserted into the wounded game, preferably in the back of the target's head as in step 615, and below the target's brain case as illustrated at step 620. Next, the user laterally maneuvers the tool 100 such that the curved region of the shank directs the pointed end of the shank into the targets brain or brain stem, as described at step 625. Finally at step 630, the target's brain is penetrated, and the wounded game is therefore quickly and humanely dispatched. The method ends at step 635.

Figure 7:
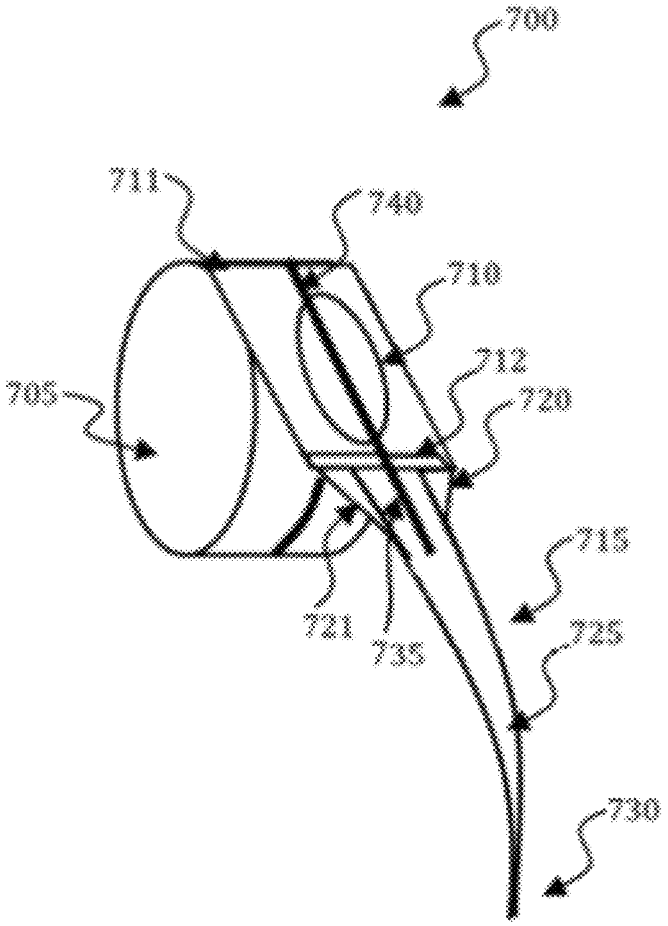
FIG. 7 depicts an embodiment of a tool dispatching wounded game in the field in accordance with an alternative embodiment.

FIG. 7 illustrates an embodiment of a portable tool 700 for humanely dispatching wounded game. Tool 700 provides a portable utility that can be carried into the field to quickly dispatch wounded game. Tool 700 includes a shank 715. Shank 715 is formed with a pointed end 730 that is configured to pierce the wounded game on the back of the head, just below the skull as illustrated in FIG. 5. Shank 715 includes a curved region 725 and a connecting end 735.

It should be appreciated that the configuration of the shank 715 can include an upward curve, downward curve, left curve, right curve, no curve, and/or any of the alternative configurations of the curved region 725 illustrated in FIGS. 3A-3G.

The curved region 725 of shank 715 is specifically configured so that after the pointed end 730 is inserted below the skull, the continued insertion of the shank 715 drives the pointed end 730 upward into the wounded game's brain and/or brain stem, thereby quickly and humanely dispatching the target. Thus, the angle of curved region 725 is critical. The angle of curved region 725 is preferably between 20 and 80 degrees (although other angles are possible, e.g., no angle), and may be selected to suit a specific target. For example, a more dramatic angle may be required for game with a larger head, longer neck, or other such anatomical feature. The angle of curved region 725 can therefore be selected to match the anatomy of the game.

Shank 715 can be formed with a tapered rectangular shape. Shank 715 is tapered so that pointed end 730 terminates in a sharp point. Alternatively, shank 715 can be formed with a tapered tubular shape or according to any of the shapes shown in FIGS. 3A-3G. In certain embodiments, the shank 715 can include support strut 720 and support strut 721 formed on or near the connecting end 735 of the shank. The support struts 720 and 721 can run along the side of, and connect to, the connecting end 735 of shank 715 and connect to grip 710. The support struts 720 and 721 are configured to strengthen the connecting end 735 of the shank 715 where the shank 715 experiences significant strain. In addition, a central thickened support 740 can be provided that further structurally supports grip 710, finger loop 705, and shank 715. In certain embodiments, shank 715 can be substantially tubular with the tubular structure of the shank 715 extending through the grip 710 and finger loop 705 serving as thickened support 740.

In a preferred embodiment, shank 715 is formed from a plastic, polymer, wood, aluminum, copper, zinc, steal, or other metal, or a combination thereof. Support struts 720 and 721 can be formed of similar materials. It should be appreciated that the tool can be used in conjunction with game fowl, dove, quail, ducks, geese, snipe, pigeon, chickens, turkey, grouse, crane, pheasant, fish, and other species of game. In addition, the length of the shank and the size of the grip may be altered to fit the specific anatomy of the game upon which the tool 700 is intended to be used. This may include providing markings on a "one size fits all" version of the shank 715 that indicates to the user roughly how deep the shank 715 needs to be inserted in order to effectively reach the brain/brain stem of a variety of different game animals. Such markings are shown in FIG. 2 as markings 220. Markings 220 can be color coded and/or labeled to identify the game species the mark is associated with. This provides the user a metric for how deep the tool should be inserted for that species.

Connecting end 735 of the shank 715 is connected to grip 710. Grip 710 is generally intended to be grasped by the thumb, although it could be grasped by other fingers in other embodiments. Grip 710 includes a front surface 711. The front side of front surface 711 can include a lip 712. Lip 712 prevents the user's thumb from slipping off the grip 710. Grip 710 also includes a hole formed to accept a retaining device 145, such as a lanyard or key chain ring. This allows a user to easily connect tool 700 to a belt, boot, gun, backpack, or other clothing article via the retaining device 145 so that the tool 700 can be easily carried into the field. In an alternative embodiment, retaining device 145 can have an elastic property or otherwise be configured with a retractable cord so that the tool 700 can be pulled away from the user for use in the field without being removed from its connection to the user when it is used.

Grip 710 can be comprised of a sub-structure such as a plastic polymer, wood, metal such as aluminum, copper, zinc, steal, other metals, or the like with a rubber coating formed over the sub-structure. In other embodiments, no coating is provided over the sub-structure. The grip 710 can include a plurality of ridges, dimples, or the like as illustrated in FIGS. 1-2 to promote a user's grip and prevent slippage. The ridges or dimples can be configured to model certain natural shapes such as a feather. It should be appreciated that any combination of ridges, rings, dimples, or the like can be included on the front surface 711 so as to best facilitate the user's grip.

Grip 710 can be connected to the top of finger loop 705. Finger loop 705 comprises a hollow ring structure. The top of the finger loop 705 can be connected to the bottom of grip 710. Alternatively, finger loop 705 and grip 710 can comprise a single curled structure, wherein a strip of material (most commonly metal, but other material could be used) is wrapped to form the finger loop 705 with a remaining portion of the material formed along the top of the finger loop 705 to form the grip 710.

In practice, a user would preferably insert a finger through the finger loop 705 while holding the grip 710 with a thumb. In some cases, the preferable finger for insertion through the finger loop 705 is a pointer finger. In other embodiments, other fingers including the middle, ring, pinky, or thumb could be inserted through the finger loop 705, leaving the remaining finger to brace against the front of finger loop 705 and the underside of grip 710.

Figure 8:
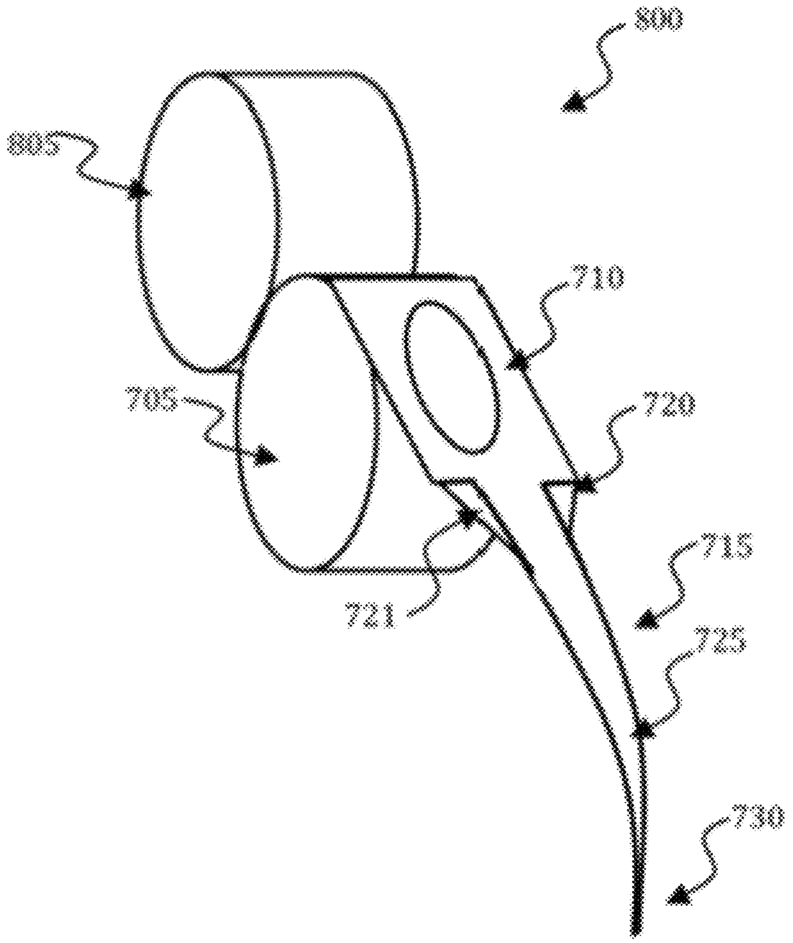
FIG. 8 depicts another embodiment of a tool for dispatching wounded game in the field in accordance with an alternative embodiment.

FIG. 8 illustrates an alternative embodiment of tool 800. It should be noted that equivalent or similar features throughout the figures are labeled with the same reference numerals. In the embodiment illustrated in FIG. 8, tool 800 includes a second finger loop 805. Second finger loop 805 can serve as a finger loop for insertion of an additional finger. Second finger loop 805 is illustrated as connected to the back of finger loop 705. However, it should be understood that the orientation of second finger loop 805, with respect to finger loop 705, could be adjusted to be at any location on the finger loop 705, for example, directly below finger loop 705 or slightly below the center of finger loop 705, according to design considerations.

Alternatively or additionally, second finger loop 805 can provide a loop for connecting a retaining device 145, such as a lanyard or key chain ring. It should be understood that additional finger loops can be included in other embodiments, wherein up to six loops could be provided.

Figure 9:
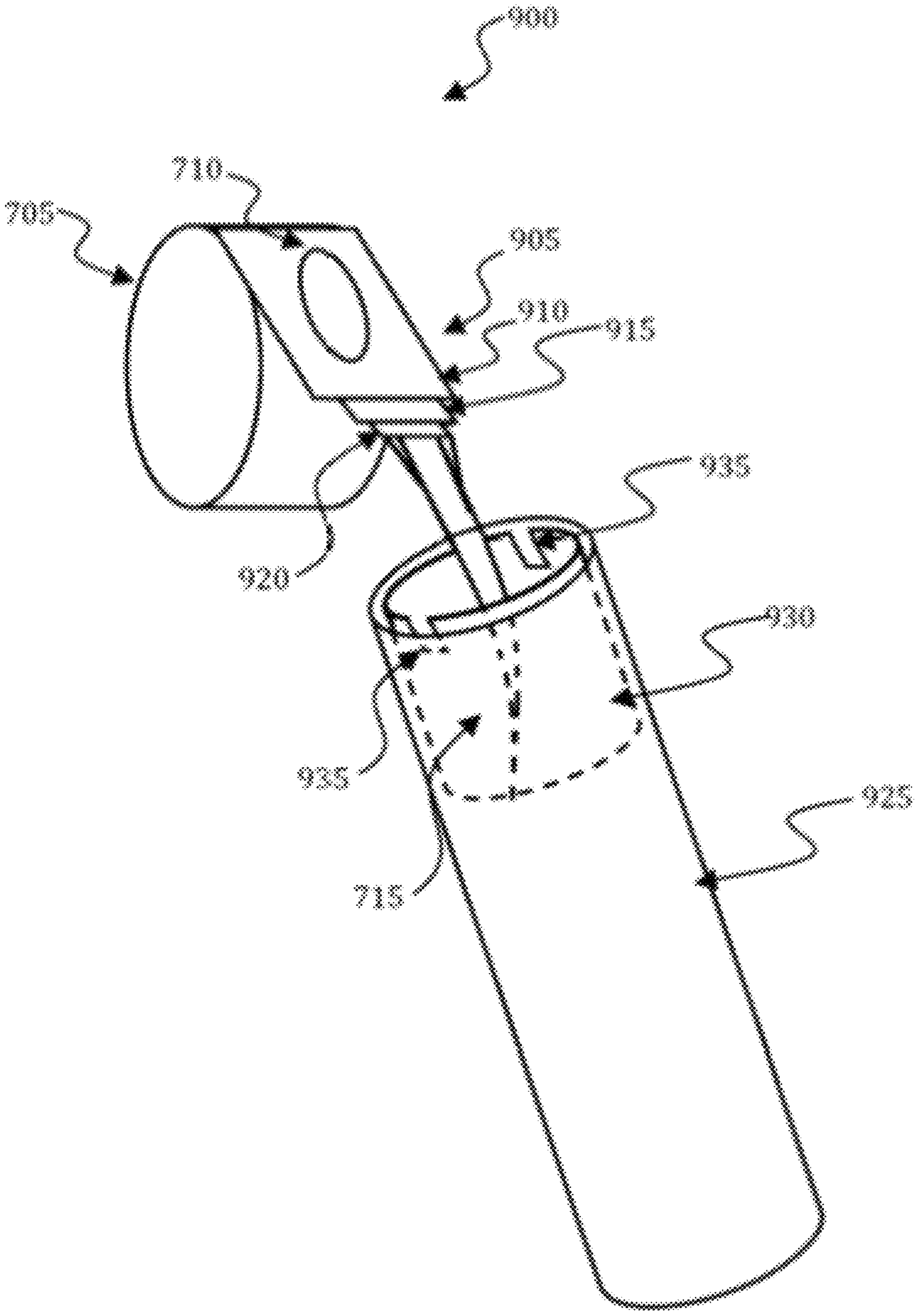
FIG. 9 depicts an embodiment of a tool for removing and/or inserting a choke tube in a gun.

FIG. 9 illustrates another embodiment of a tool 900. Tool 900 generally comprises a shank 715, grip 710, and finger loop 705 as with tool 700. However, tool 900 further comprises a choke wrench 905. Choke wrench 905 can comprise a series of choke wrench steps 910, 915, and 920 formed in the front end of grip 710.

Shotguns barrels, such as barrel 925, are often configured with a choke tube 930. The choke tube 930 is generally threaded into the end of the barrel 925 and controls the spread characteristics of a shot exiting the barrel 925. Different choke tubes 930 can be exchanged and inserted into the barrel to modify the shot spread characteristics. Choke tubes, such as choke tube 930, generally include slots 935 where a tool 900 can be used to insert or remove the choke tube 930.

Shotgun barrels, such as barrel 925, generally come in a variety of diameters. The diameter across the opening in the barrel is known as the gauge. Typical shotguns come in 10 gauge, 12 gauge, 20 gauge, and "410" sizes. A variety of less common gauges also exist.

Choke wrench steps 910, 915, and 920 are configured to interface with slots 935 in order to facilitate the threading or unthreading of the choke tube 930. Each of choke step 910, choke step 915, and choke step 920 are sized to engage with a specific shotgun gauge. For example, in one embodiment, choke step 910 is sized to fit a 12 gauge shotgun choke tube 930, choke step 915 is sized to fit a 20 gauge shotgun choke tube 930, and choke step 920 is sized to fit a 410 gauge shotgun choke tube 930. It should be appreciated that additional or alternative choke steps can be included in tool 900 to fit other shotgun gauges in other embodiments. In some cases, seven or more choke steps can be provided.

It is further noteworthy that often choke tubes, such as choke tube 930, come in a variety of styles, most importantly with different sized slots 935. The size of slots 935 can also vary according to shotgun brand. In particular, the depth and width of the slots 935 may vary. Thus, in other embodiments, the thickness and depth of choke step 910, choke step 915, and choke step 920 can be matched to fit a specific slot 935 size according to design considerations.

In still other embodiments, the choke steps can be incorporated into the natural shape of the grip 710 and finger loop 705. For example, in an exemplary embodiment, the grip 710 and finger loop 705 can be configured to look like a curled feather with the shank 715 configured to look like the quill of the feather. In such embodiments, the successive barbs in the feather vein nearest the shank 715 can comprise the choke steps 910, 915, and 920.

Figure 10A:
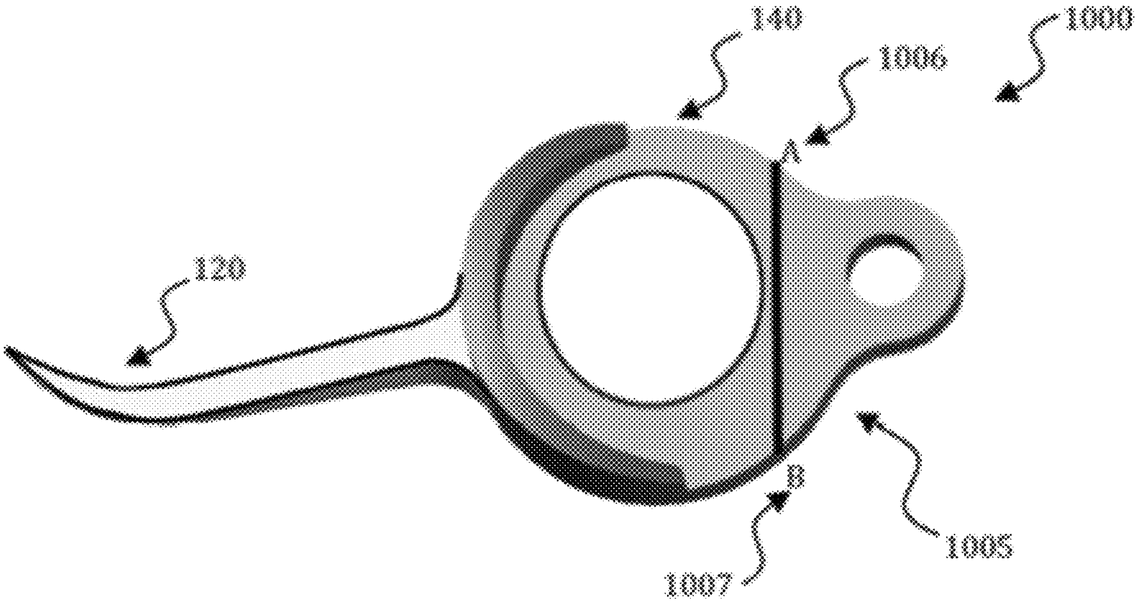
FIG. 10A depicts another embodiment of a tool for removing and/or inserting a choke tube in a gun.
Figure 11:
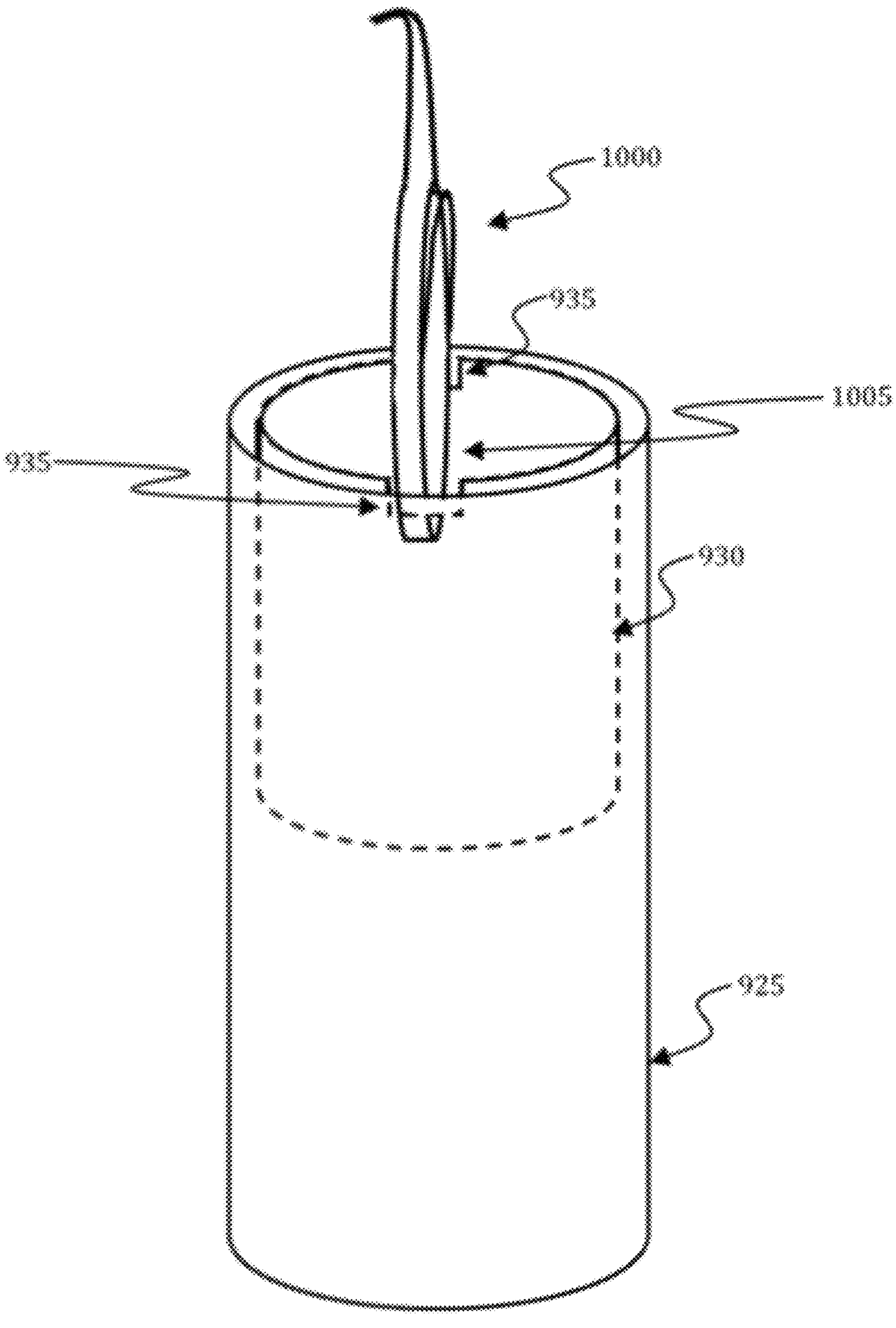
FIG. 11 depicts the use of a tool for removing and/or inserting a choke tube in a gun in accordance with the disclosed embodiments.

FIG. 10A illustrates an embodiment of a tool 1000. As with tool 100 shown in FIG. 1, tool 1000 includes a shank 120 and grip 140, with associated configurations as described above with respect to FIGS. 1 and 1A. However, tool 1000 further includes a choke wrench 1005. In this embodiment, the grip 140 is configured with a rounded edge such that the distance between two points along the edge, for example, point A 1006 and point B 1007, matches the distance between slots 935 on a choke tube 930. This is illustrated in FIG. 11, where the tool 1000 is illustrated in use to remove a choke tube 930. Choke wrench 1005 is engaged with choke tube 930 via slots 935.

As discussed above, choke tubes come in a variety of gauges. The curvature of the grip edge, for example, between point A 1006 and point B 1007, and/or a plurality of other sets of points along the grip edge, can be configured to specifically provide the proper distances for any of the possible of gauges. Thus, the choke wrench can be used to insert or remove choke tubes of any gauge.

Figure 10B:
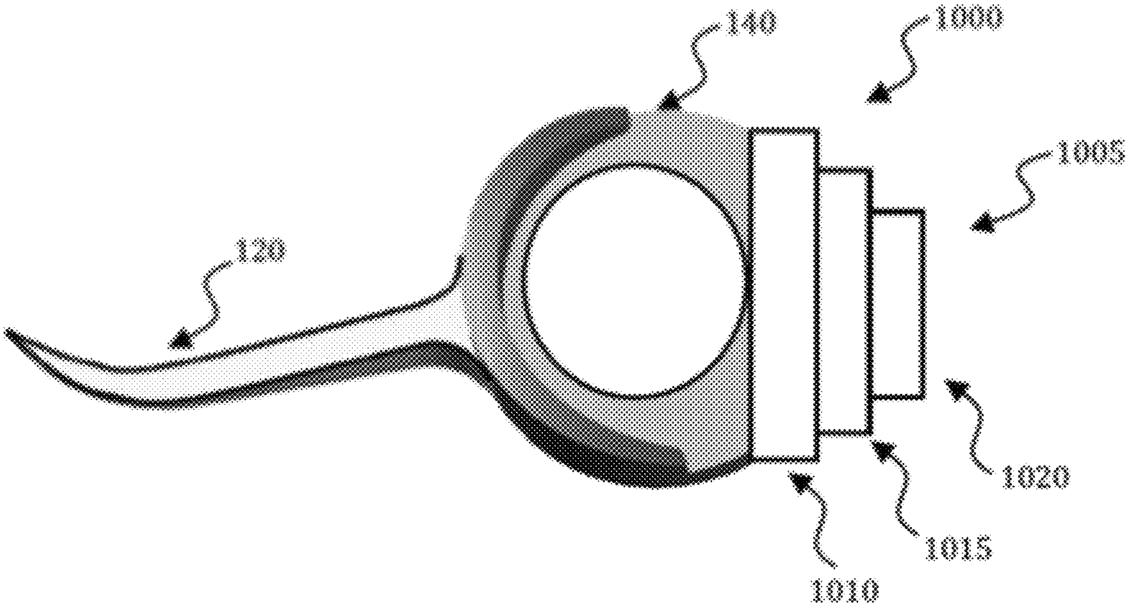
FIG. 10B depicts another embodiment of a tool for removing and/or inserting a choke tube in a gun.

FIG. 10B illustrates another embodiment of tool 1000. In this embodiment, the back end of the grip 140 is configured into a choke wrench 1005 with a series of choke steps; namely choke step 1010, choke step 1015, and choke step 1020. Choke steps 1010, 1015, and 1020 are configured to interface with slots 935 in order to facilitate the threading or unthreading of the choke tube 930. Each of choke step 1010, choke step 1015, and choke step 1020 are sized to engage with a specific shotgun gauge. For example, in one embodiment, choke step 1010 is sized to fit a 12 gauge shotgun choke tube 930, choke step 1015 is sized to fit a 20 gauge shotgun choke tube 930, and choke step 1020 is sized to fit a 410 gauge shotgun choke tube 930. It should be appreciated that additional or alternative choke steps can be included in tool 1000 to fit other shotgun gauges in other embodiments. In some cases, seven or more choke steps can be provided.

Furthermore, choke tubes, such as choke tube 930, come in a variety of styles, most notably with different sized slots 935. The size of slots 935 can also vary according to the shotgun brand. Thus, in other embodiments of tool 1000, the thickness of the grip edge and/or the thickness and depth of the choke step 1010, choke step 1015, and choke step 1020 can be matched to fit a specific slot 935 size according to design considerations.

In another embodiment, the shank 715 of tool 700, tool 800, and/or tool 900 can be used to extract jammed shells from the magazine, receiver, or chamber of a shotgun. In yet another embodiment, the shank 120 of tool 100 or tool 1000 can be used to extract jammed shells from the magazine, receiver, or chamber of a shotgun.

Figure 12:
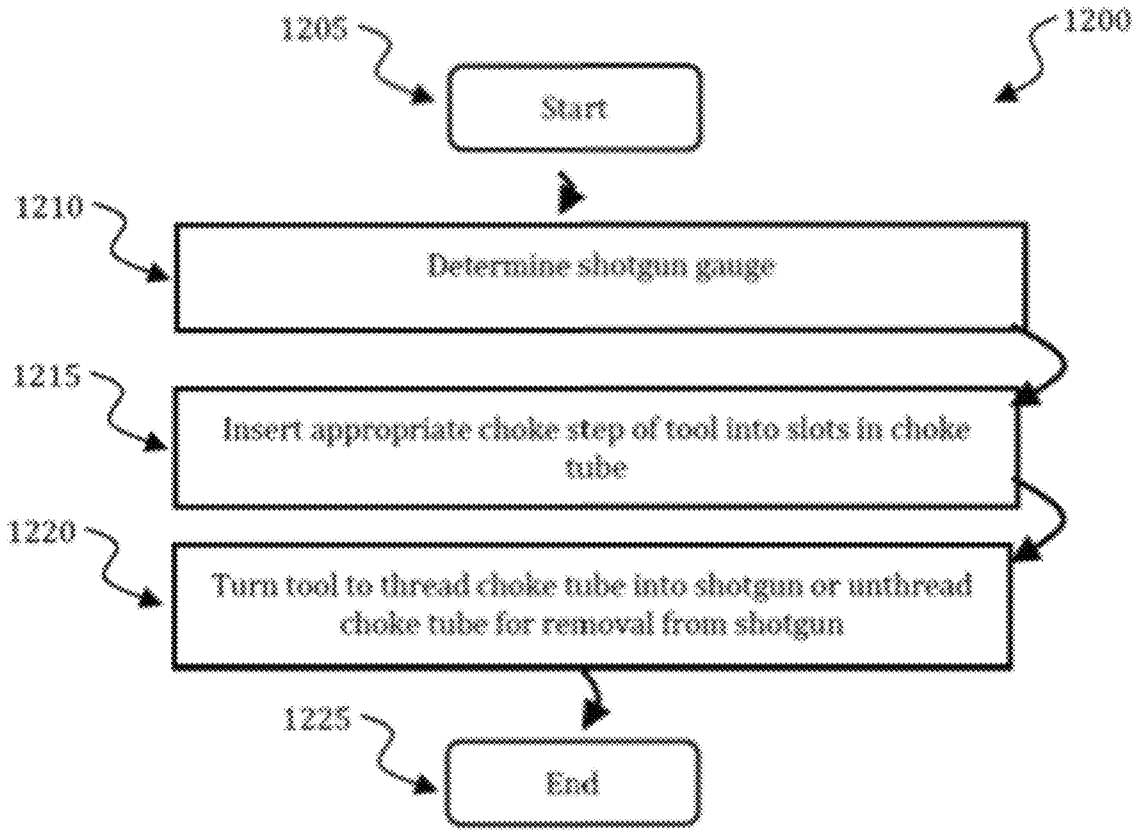
FIG. 12 depicts a flow chart depicting steps associated with a method of removing a choke tube from a gun in accordance with an embodiment.

FIG. 12 illustrates a method 1200 for installing or removing a choke tube in accordance with the embodiments disclosed herein. The method starts at step 1205. At step 1210, the correct gauge of the gun and/or choke tube can be determined. Next at step 1215, the choke wrench associated with the tool can be inserted into the slots in the choke tube. It should be appreciated that the appropriate choke step or width of the choke wrench should be selected to properly fit in the slots of the choke wrench. The tool is then turned in order to thread the choke tube into the firearm or unthread the choke tube out of the firearm as shown at step 1220. The choke tube has thus been properly installed or removed. The method ends at step 1225.

FIGS. 13-40 illustrate additional aspects of the embodiments, disclosed herein. It should be appreciated that, although FIGS. 13-40 illustrate certain aspects of the disclosed systems, any such aspect could be incorporated with other features without departing from the scope of the systems and methods disclosed herein.

Figure 13:
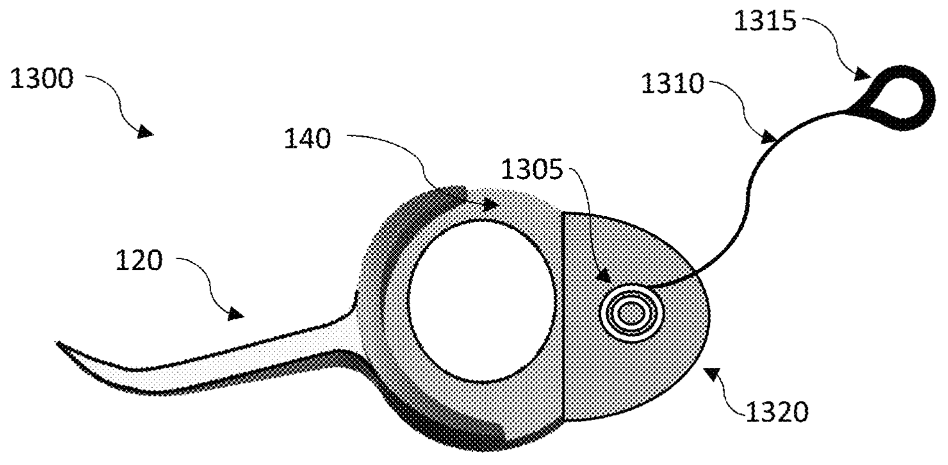
FIG. 13 depicts aspects of a tool including a lanyard, in accordance with the disclosed embodiments.

FIG. 13 illustrates an embodiment of a tool 1300. As with tool 100 shown in FIG. 1, tool 1300 includes a shank 120 and grip 140, with associated configurations as described above with respect to FIGS. 1 and 1A. However, tool 1300 further includes an internal spool 1305 configured to spool a lanyard 1310. The spool can include a coil, so that the lanyard 1310 is automatically spooled, such that the lanyard 1305 is retractable. The lanyard 1310 can include a hook 1315 which can comprise a loop, key ring, carabiner, or other such fastener. It should be appreciated that in such an embodiment, the grip 140 or a portion of the grip such as portion 1320 can be configured to be hollow, so that the spool can be formed therein. In other embodiments, the spool can be configured on a surface of the grip.

Figure 14:
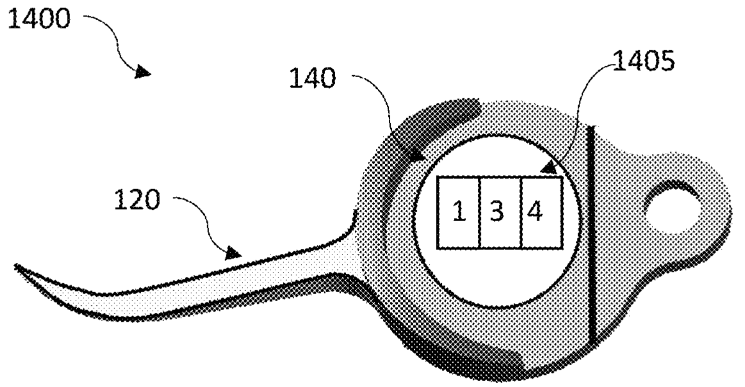
FIG. 14 depicts aspects of a tool including a counter, in accordance with the disclosed embodiments.

FIG. 14 illustrates an embodiment of a tool 1400. As with tool 100 shown in FIG. 1, tool 1300 includes a shank 120 and grip 140, with associated configurations as described above with respect to FIGS. 1 and 1A. However, tool 1400 further includes a counter 1405. In certain embodiments, the counter 1405 can comprise a rotatable disc with 10 surface showing the numbers 0-9, with a dowel extending through the center of the disc so that the numbers can be dialed for counting. In certain embodiments, the counter can include multiple discs, to allow the counting of additional significant figures. FIG. 14 illustrates a system with three discs.

Figure 15:
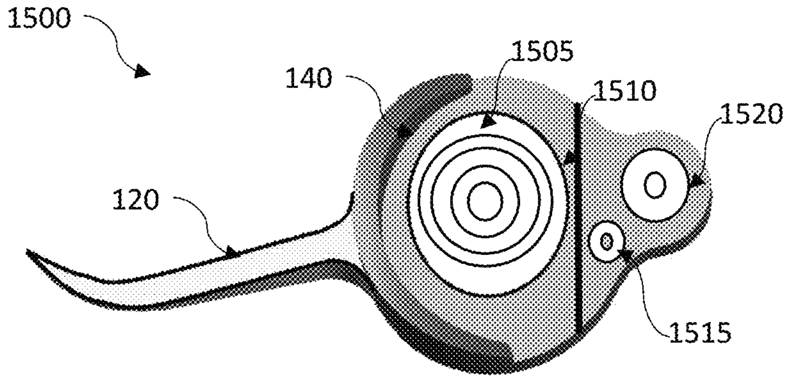
FIG. 15 depicts aspects of a tool including a speaker, in accordance with the disclosed embodiments.

FIG. 15 illustrates an embodiment of a tool 1500. As with tool 100 shown in FIG. 1, tool 1500 includes a shank 120 and grip 140, with associated configurations as described above with respect to FIGS. 1 and 1A. However, tool 1500 further includes a speaker 1505 configured in the grip 140. In certain embodiments, the speaker 1505 can be operably connected to a battery 1510 which can also be mounted on or in grip 140. The speaker can be operably connected to a receiver 1515. In certain embodiments, the receiver can comprise a Bluetooth® receiver, or other such receiver. The speaker can be operated with a mobile device, and can be controlled via the mobile device. The speaker can include a "pairing" and/or power button 1520.

Figure 16:
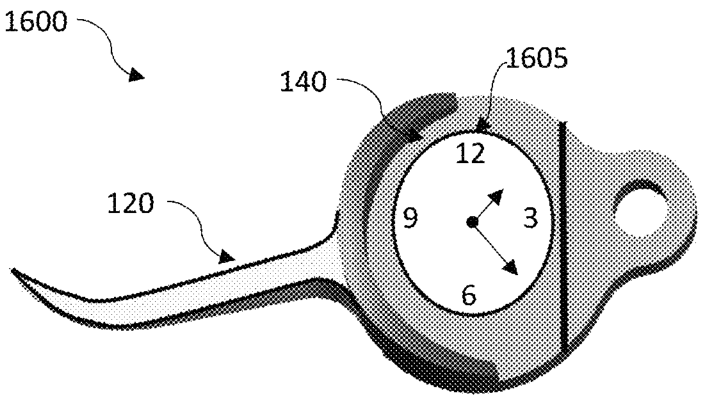
FIG. 16 depicts aspects of a tool including a clock, in accordance with the disclosed embodiments.

FIG. 16 illustrates an embodiment of a tool 1600. As with tool 100 shown in FIG. 1, tool 1600 includes a shank 120 and grip 140, with associated configurations as described above with respect to FIGS. 1 and 1A. However, tool 1600 further includes a clock 1605 configured in the grip 140. In certain embodiments, the clock 11605 can comprise a digital watch or analog watch. An analog watch is illustrated in FIG. 16. The watch can be powered with a battery, or with a winding device.

Figure 17:
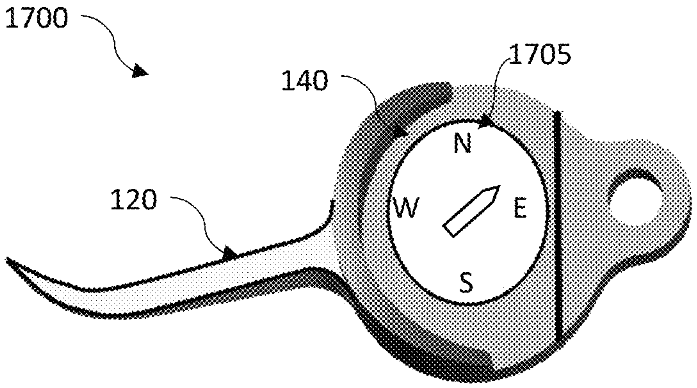
FIG. 17 depicts aspects of a tool including a compass, in accordance with the disclosed embodiments.

FIG. 17 illustrates an embodiment of a tool 1700. As with tool 100 shown in FIG. 1, tool 1700 includes a shank 120 and grip 140, with associated configurations as described above with respect to FIGS. 1 and 1A. However, tool 1700 further includes a compass 1705. In certain embodiments, the counter 1705 can comprise magnetic arm pinned to a face, marked with directions.

FIG. 17 illustrates an embodiment of a tool 1700. As with tool 100 shown in FIG. 1, tool 1700 includes a shank 120 and grip 140, with associated configurations as described above with respect to FIGS. 1 and 1A. However, tool 1700 further includes a compass 1705. In certain embodiments, the counter 1705 can comprise magnetic arm pinned to a face, marked with directions.

Figure 18:
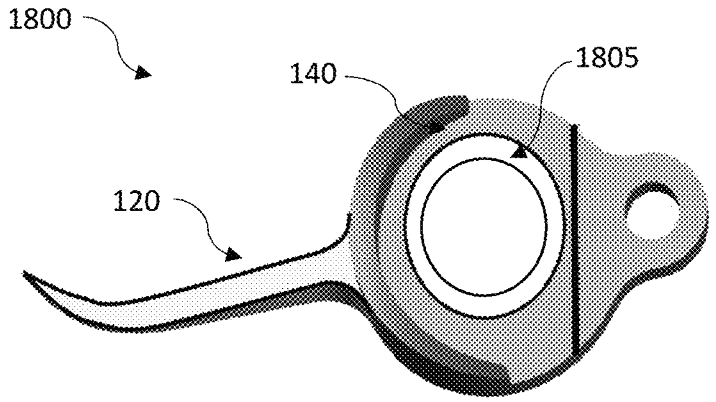
FIG. 18 depicts aspects of a tool including a magnifying glass, in accordance with the disclosed embodiments.

FIG. 18 illustrates an embodiment of a tool 1800. As with tool 100 shown in FIG. 1, tool 1800 includes a shank 120 and grip 140, with associated configurations as described above with respect to FIGS. 1 and 1A. However, tool 1800 further includes a magnifying glass 1805 formed in grip 140.

Figure 19:
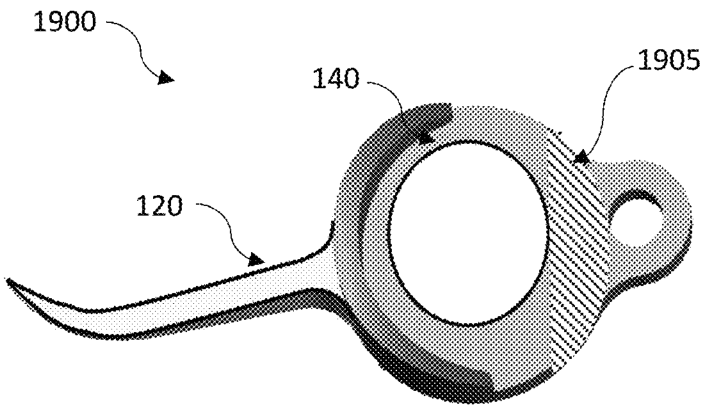
FIG. 19 depicts aspects of a tool including a filing surface, in accordance with the disclosed embodiments.

FIG. 19 illustrates an embodiment of a tool 1900. As with tool 100 shown in FIG. 1, tool 1900 includes a shank 120 and grip 140, with associated configurations as described above with respect to FIGS. 1 and 1A. However, tool 1900 further includes a filing surface 1905. In certain embodiments, the filing surface can be configured on some or all of the top or bottom surface of the grip 140.

Figure 20:
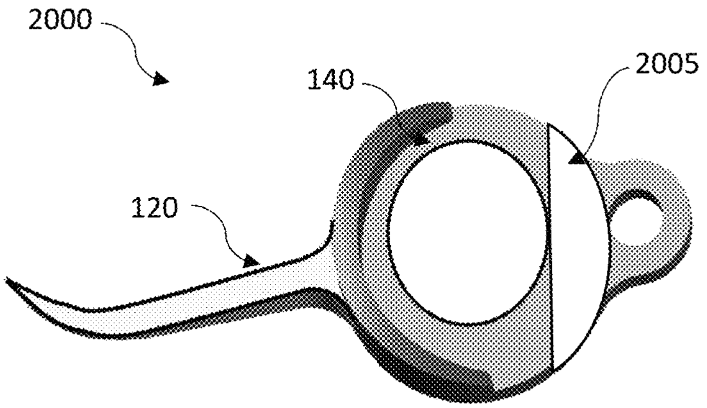
FIG. 20 depicts aspects of a tool including a flint surface, in accordance with the disclosed embodiments.

FIG. 20 illustrates an embodiment of a tool 2000. As with tool 100 shown in FIG. 1, tool 2000 includes a shank 120 and grip 140, with associated configurations as described above with respect to FIGS. 1 and 1A. However, tool 2000 further includes a flint surface 2005. In certain embodiments, the flint surface can be configured on some or all of the top or bottom surface of the grip 140.

Figure 21:
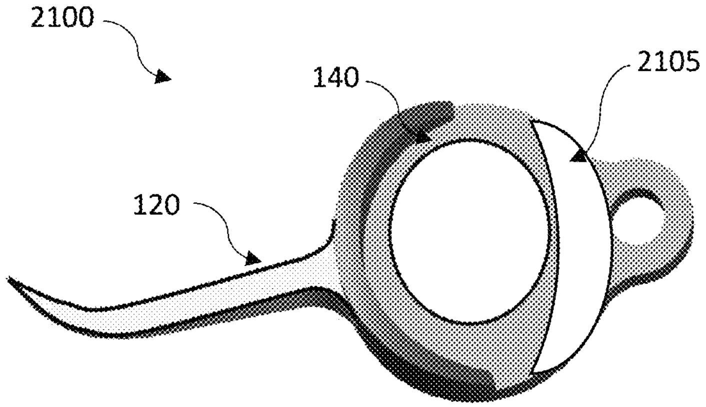
FIG. 21 depicts aspects of a tool including a stone sharpening surface, in accordance with the disclosed embodiments.

FIG. 21 illustrates an embodiment of a tool 2100. As with tool 100 shown in FIG. 1, tool 2100 includes a shank 120 and grip 140, with associated configurations as described above with respect to FIGS. 1 and 1A. However, tool 2100 further includes a sharpening stone surface 2105. In certain embodiments, the flint surface can be configured on some or all of the top or bottom surface of the grip 140.

Figure 22:
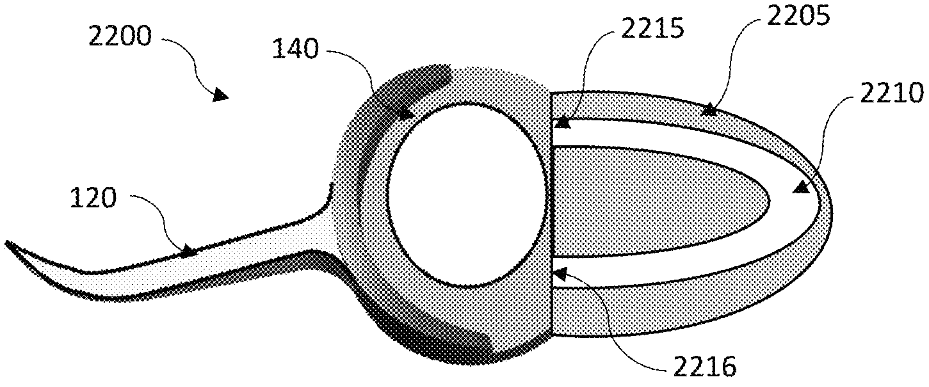
FIG. 22 depicts aspects of a tool including a clip, in accordance with the disclosed embodiments.

FIG. 22 illustrates an embodiment of a tool 2200. As with tool 100 shown in FIG. 1, tool 2200 includes a shank 120 and grip 140, with associated configurations as described above with respect to FIGS. 1 and 1A. However, tool 2200 further includes a clip 2205. The clip 2205 can comprise any clip. In an exemplary embodiment, the clip 2205 comprises a "U" shaped piece 2210 connected at end 2215 and end 2216 to the grip 140, such that the curved surface is disconnected from the grip. In other embodiments, other clips can be used.

Figure 23:
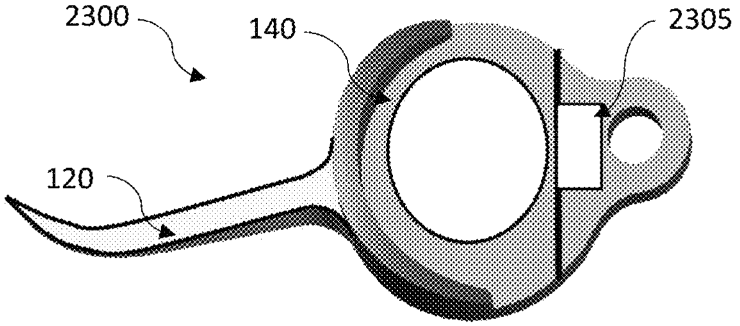
FIG. 23 depicts aspects of a tool including a can opening lip, in accordance with the disclosed embodiments.

FIG. 23 illustrates an embodiment of a tool 2300. As with tool 100 shown in FIG. 1, tool 2300 includes a shank 120 and grip 140, with associated configurations as described above with respect to FIGS. 1 and 1A. However, tool 2300 further includes a can opening lip 2305 which can be configured on the surface of the grip 140. The can opening lip can be used to open pop top cans.

Figure 24:
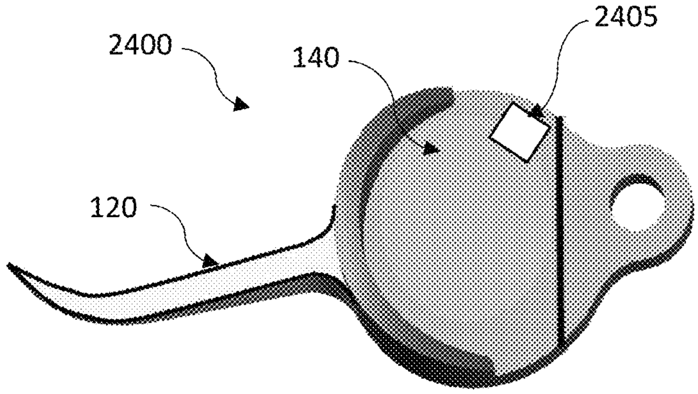
FIG. 24 depicts aspects of a tool including a whistle, in accordance with the disclosed embodiments.

FIG. 24 illustrates an embodiment of a tool 2400. As with tool 100 shown in FIG. 1, tool 2400 includes a shank 120 and grip 140, with associated configurations as described above with respect to FIGS. 1 and 1A. However, tool 2400 further includes a whistling slot 2405 be formed in the surface of the grip 140. The whistling slot 2405 is shaped such air can be forced across the slot by a user in order to make a whistling sound.

Figure 25:
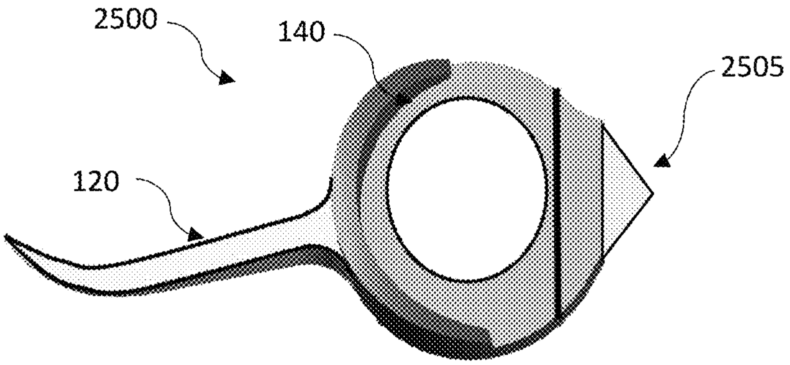
FIG. 25 depicts aspects of a tool including a utility point, in accordance with the disclosed embodiments.

FIG. 25 illustrates an embodiment of a tool 2500. As with tool 100 shown in FIG. 1, tool 2400 includes a shank 120 and grip 140, with associated configurations as described above with respect to FIGS. 1 and 1A. However, tool 2500 further includes a utility point 2505 be formed in the perimeter of the grip 140. The utility point 2505 is shaped to be inserted into the slot in a band connected to a bird, and then used for leverage to separate the ends of the band so that it can be removed. In certain embodiment the utility point 2505 can be used for other purposes, including but not limited to, piercing the skin of an aluminum can.

Figure 26:
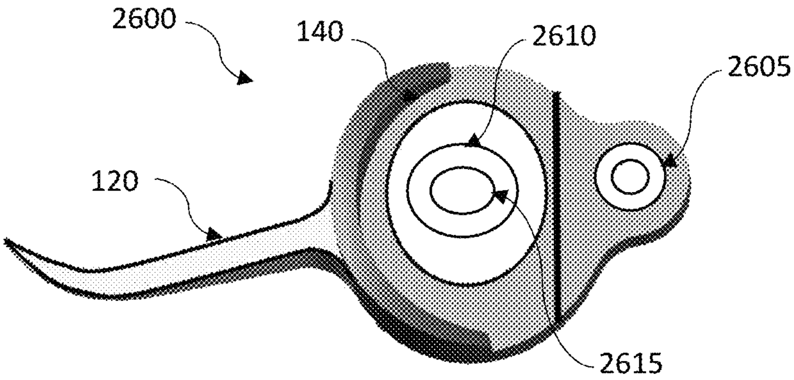
FIG. 26 depicts aspects of a tool including a light, in accordance with the disclosed embodiments.

FIG. 26 illustrates an embodiment of a tool 2600. As with tool 100 shown in FIG. 1, tool 2600 includes a shank 120 and grip 140, with associated configurations as described above with respect to FIGS. 1 and 1A. However, tool 2600 further includes a light 2605 be formed in the surface of the grip 140. The light 2605 can be operably connected to a battery 2610 which can be configured in a hollow space in the grip 140, or in a housing formed on the surface of the grip 140. The light 2605 can also be connected to a button 2615 used to turn the light on and off. In certain embodiments, the light can be an LED light, and can be provided in white light, red light, or other such color of light.

Figure 27:
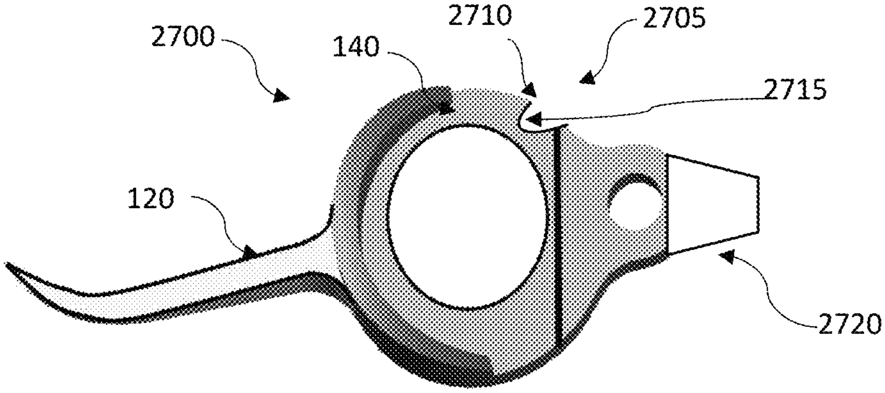
FIG. 27 depicts aspects of a tool including a skinning slot, bottle opener, and screwdriver, in accordance with the disclosed embodiments.

FIG. 27 illustrates an embodiment of a tool 2700. As with tool 100 shown in FIG. 1, tool 2700 includes a shank 120 and grip 140, with associated configurations as described above with respect to FIGS. 1 and 1A. However, tool 2700 further includes a skinning slot 2705 be formed in the perimeter of the grip 140. The skinning slot 2705 can comprise a notch 2710, with a sharp interior edge 2715. The skinning slot may also be used as a bottle opener. The tool 2700 further includes a screwdriver head 2720 formed along the perimeter of the grip 140. The screwdriver head can comprise a flat head or a Phillips head driver.

Figure 28:
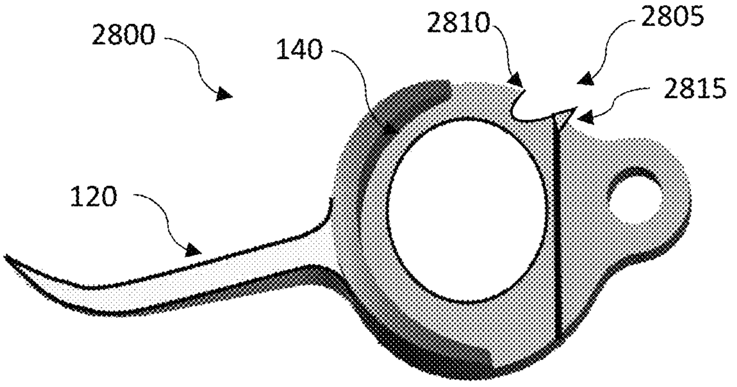
FIG. 28 depicts aspects of a tool including a package opener, in accordance with the disclosed embodiments.

FIG. 28 illustrates an embodiment of a tool 2800. As with tool 100 shown in FIG. 1, tool 2800 includes a shank 120 and grip 140, with associated configurations as described above with respect to FIGS. 1 and 1A. However, tool 2800 further includes a package opener 2805 be formed in the perimeter of the grip 140. The package opener can comprise a notch 2910, with a sharp point 2815.

Figure 29:
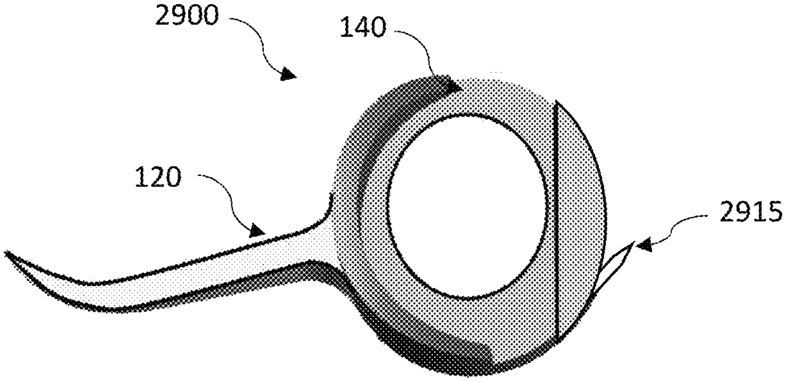
FIG. 29 depicts aspects of a tool including a writing implement, in accordance with the disclosed embodiments.

FIG. 29 illustrates an embodiment of a tool 2900. As with tool 100 shown in FIG. 1, tool 2900 includes a shank 120 and grip 140, with associated configurations as described above with respect to FIGS. 1 and 1A. However, tool 2900 further includes a writing implement 2905 formed along the perimeter of the grip 140. The writing implement 2905 can comprise a pen, pencil, chalk, marker, or other such writing implement.

Figure 30:
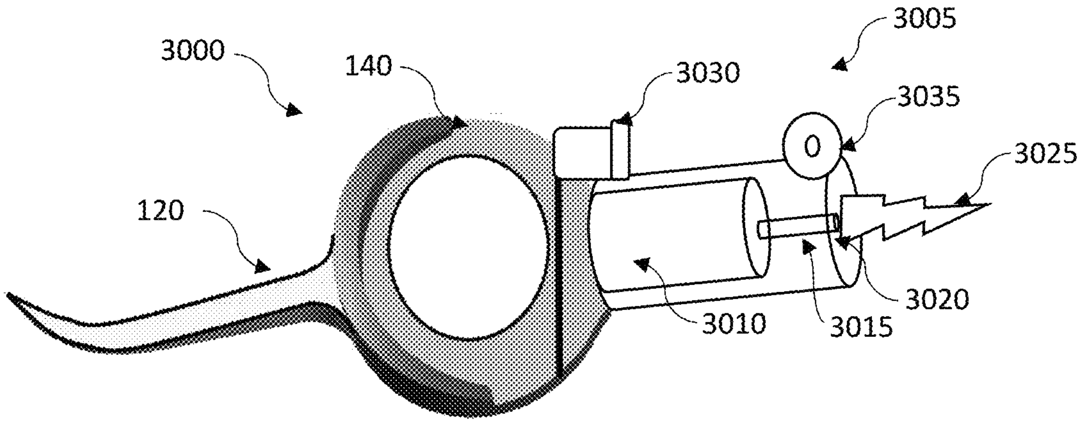
FIG. 30 depicts aspects of a tool including a lighter, in accordance with the disclosed embodiments.

FIG. 30 illustrates an embodiment of a tool 3000. As with tool 100 shown in FIG. 1, tool 3000 includes a shank 120 and grip 140, with associated configurations as described above with respect to FIGS. 1 and 1A. However, tool 2900 further includes a lighter assembly 3005 connected to the grip 140. The lighter assembly 3005 can comprise a housing 3010, with a fluid container therein, used to hold light fluid. The assembly 3005 can further include a distribution line 3015, leading to the spout 3020 where flame 3025 is generated. Button 3030 can open a valve in the distribution line 3015 to allow fluid to flow to the spout, and spark wheel 3035 can be used to initiate a spark which lights the exiting fluid.

Figure 31:
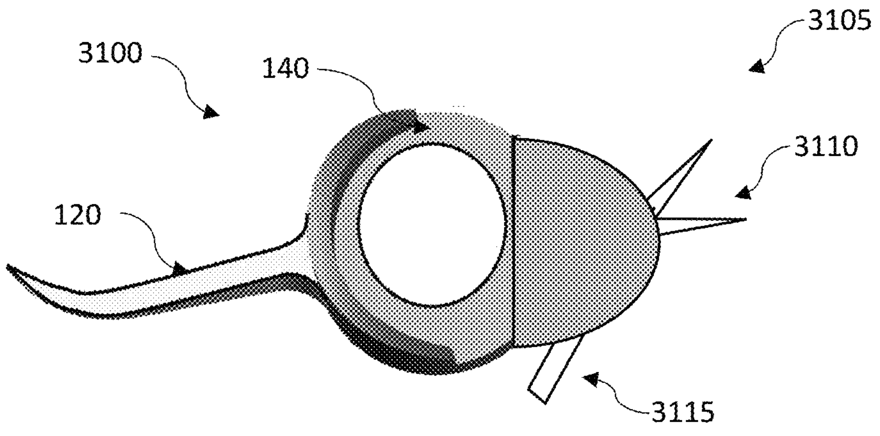
FIG. 31 depicts aspects of a tool including a scissor, in accordance with the disclosed embodiments.

FIG. 31 illustrates an embodiment of a tool 2900. As with tool 100 shown in FIG. 1, tool 3100 includes a shank 120 and grip 140, with associated configurations as described above with respect to FIGS. 1 and 1A. However, tool 3100 further includes a scissor assembly implement 3105 formed in the grip 140. The scissor assembly 3105 can include scissor jaws 3110 connected to scissor handle 3115. Operating the handle 3115 moves one of the jaws toward the other. In certain embodiments, the component can be configured in a hollow space in the grip 140, or can be held in place on an external surface of the grip 140 with a pin at the vertex of the scissor jaws 3110

Figure 32:
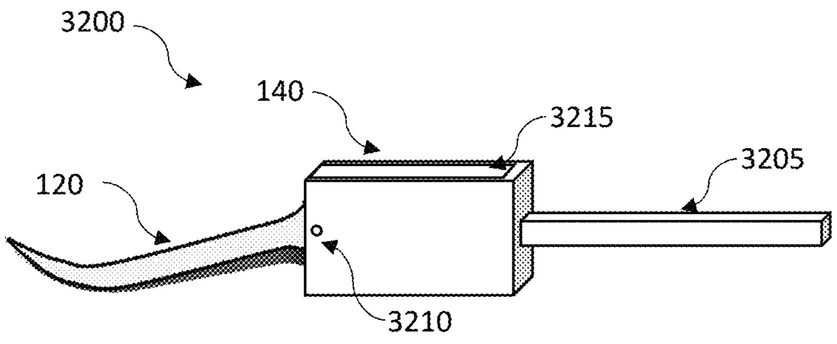
FIG. 32 depicts aspects of a tool including a flint stick, in accordance with the disclosed embodiments.

FIG. 32 illustrates an embodiment of a tool 3200. As with tool 100 shown in FIG. 1, tool 3200 includes a shank 120 and grip 140, with associated configurations as described above with respect to FIGS. 1 and 1A. It should be appreciated that the grip 140 can be configured with various shapes, and an alternative shape for grip 140 is illustrated in FIG. 32. Tool 3200 further includes a flint stick 3205. In certain embodiments, the flint stick 3205 can be configured to extend from a surface of the grip 140. In this embodiment, the shank 120 can further be configured to be folded back into the grip 140. A pin 3210 can extend through the shank 120, allowing the shank 120 to be folded back into slot 3215. A locking mechanism can be included to lock the shank in place in its operable or stowed position.

Figure 33:
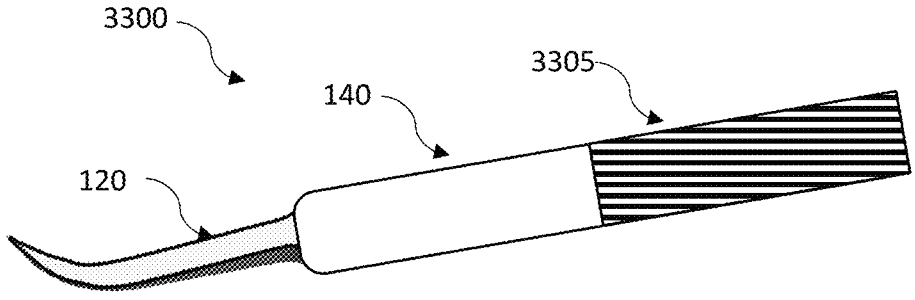
FIG. 33 depicts aspects of a tool including a file, in accordance with the disclosed embodiments.

FIG. 33 illustrates an embodiment of a tool 3300. As with tool 100 shown in FIG. 1, tool 3300 includes a shank 120 and grip 140, with associated configurations as described above with respect to FIGS. 1 and 1A. It should be appreciated that the grip 140 can be configured with various shapes, and an alternative shape for grip 140 is illustrated in FIG. 33. Tool 3300 further includes a file 3305 formed in grip 140.

Figure 34:
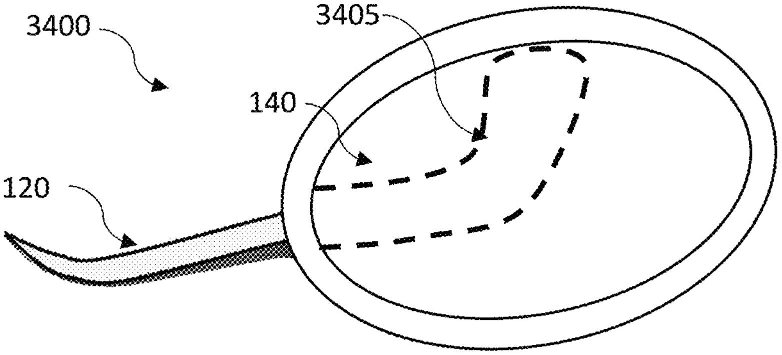
FIG. 34 depicts aspects of a tool including a chamber for a retractable shank, in accordance with the disclosed embodiments.

FIG. 34 illustrates an embodiment of a tool 3400. As with tool 100 shown in FIG. 1, tool 3400 includes a shank 120 and grip 140, with associated configurations as described above with respect to FIGS. 1 and 1A. It should be appreciated that the grip 140 can be configured with various shapes, and an alternative shape for grip 140 is illustrated in FIG. 33. Tool 3400 further includes an internal chamber 3405 formed in grip 140, configured such that the shank 120 to be retracted into the chamber 3405.

Figure 35:
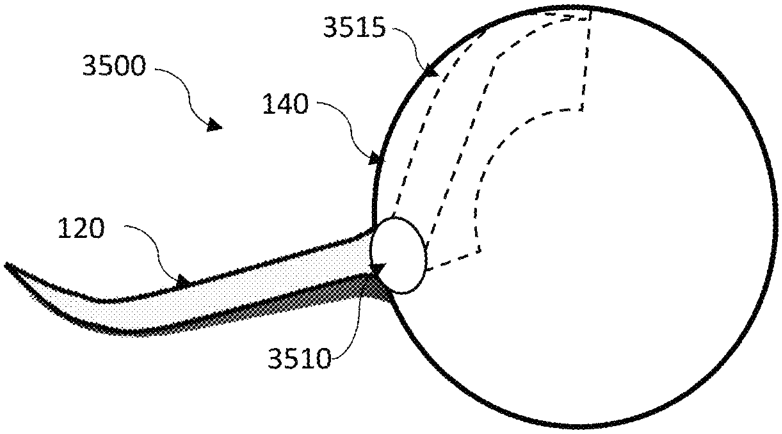
FIG. 35 depicts aspects of a tool including a folding shank, in accordance with the disclosed embodiments.

FIG. 35 illustrates an embodiment of a tool 3500. As with tool 100 shown in FIG. 1, tool 3500 includes a shank 120 and grip 140, with associated configurations as described above with respect to FIGS. 1 and 1A. It should be appreciated that the grip 140 can be configured with various shapes, and an alternative shape for grip 140 is illustrated in FIG. 35. Tool 3500 further includes a rotating pin 3510 allowing the shank 120 to be rotated into a slot 3515 formed in the grip 140. the pin 3510 can extend through the shank 120, allowing the shank 120 to be folded back into slot 3515. A locking mechanism can be included to lock the shank in place in its operable or stowed position.

Figure 36:
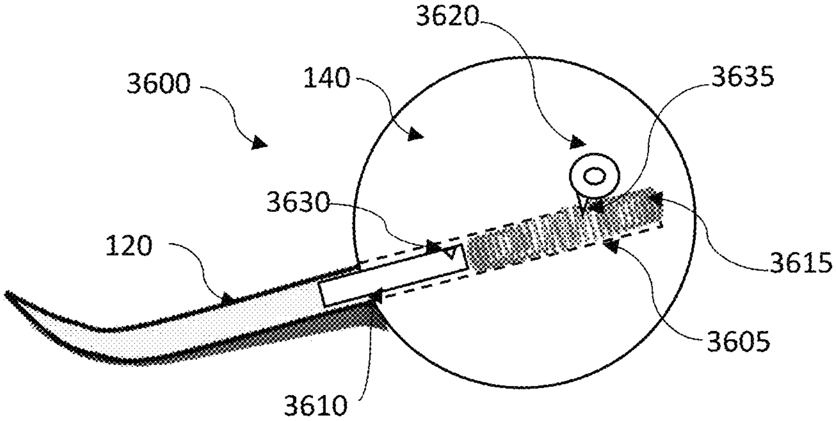
FIG. 36 depicts aspects of a tool including a retractable shank, in accordance with the disclosed embodiments.

FIG. 36 illustrates an embodiment of a tool 3600. As with tool 100 shown in FIG. 1, tool 3500 includes a shank 120 and grip 140, with associated configurations as described above with respect to FIGS. 1 and 1A. It should be appreciated that the grip 140 can be configured with various shapes, and an alternative shape for grip 140 with an interior volume is illustrated in FIG. 35. Tool 3600 further includes a slot 3605, with an action bar 3610 and spring 3615 formed therein. The action bar 3610 can be connected to the shank 120, or can comprise an extension of shank 120. The spring 3615 can be configured to push the action bar 3610 toward the perimeter of the grip 140. The shank 120 can thus be stored in the slot 3605. To release the shank 120, button 3620 can be pushed to release catch 3625 configured to engage catch notch 3630. When the release catch 3625 disengages the catch notch 3630, the spring 3615 pushes the action bar, which in turn pushes the shank 120 out of the grip 140.

Figure 37:
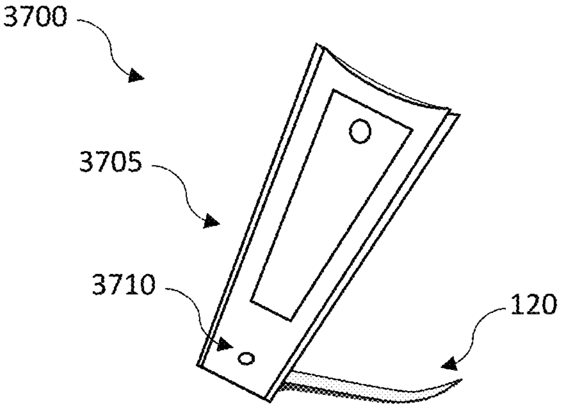
FIG. 37 depicts aspects of a tool including fingernail clippers with a shank, in accordance with the disclosed embodiments.

FIG. 37 illustrates an embodiment of a tool 3700. In this embodiment, fingernail clippers 3705 can be fitted with a pin 3710 configured to attach to a shank 120.

Figure 38:
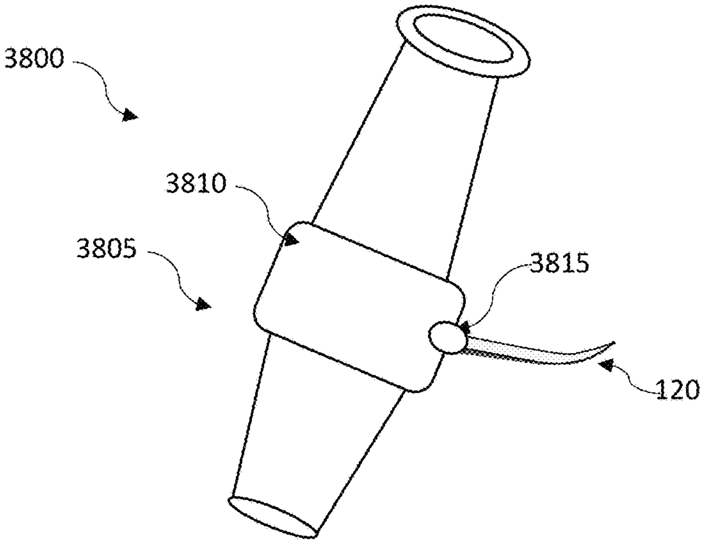
FIG. 38 depicts aspects of a tool including a game call with a connected shank, in accordance with the disclosed embodiments.

FIG. 38 illustrates an embodiment of a tool 3800. In this embodiment, a game call 3805 such as a duck call or goose call, can be fitted with a connecting ring 3810. A pin 3815 can be used to mount a shank 120 to the game call 3805.

Figure 39:
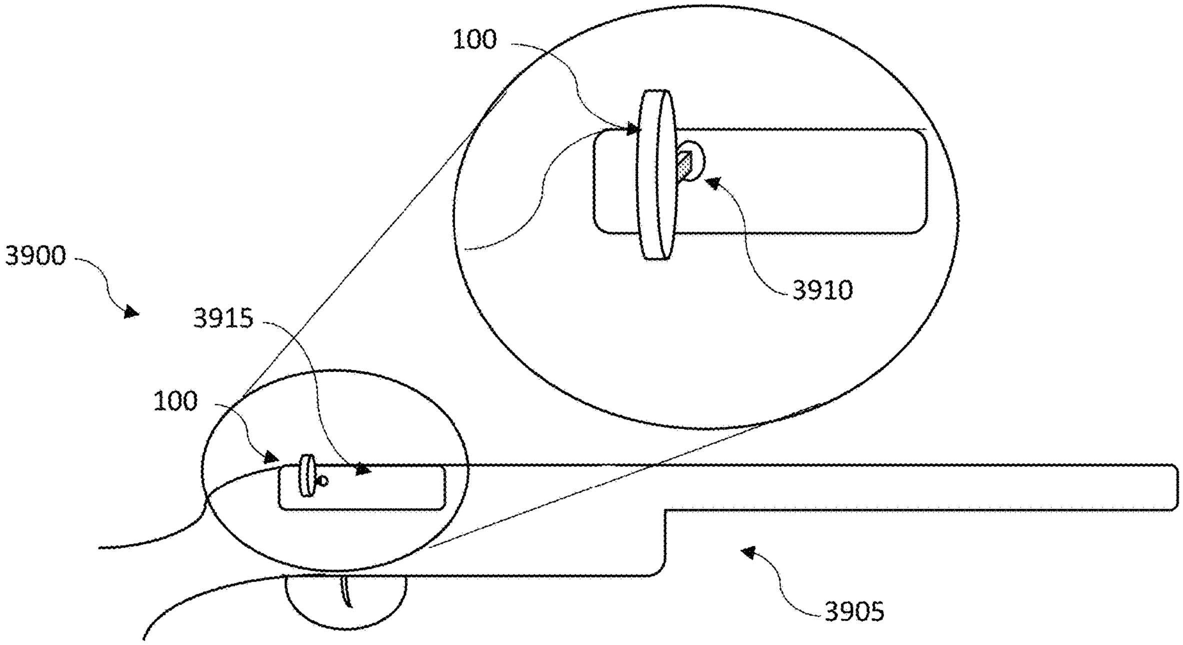
FIG. 39 depicts aspects of a tool used as a charging handle, in accordance with the disclosed embodiments.

FIG. 39 illustrates another embodiment of a tool 3900 in accordance with the disclosed embodiments. In this embodiment, the tool 100 can be used in association with a shotgun 3905. In this embodiment, the shank 120, of tool 100 can be inserted into the bolt 3915, in bolt insert hole 3910, or other such opening. The tool 100 can then be used as a charge handle to open the bolt 3915 as illustrated in the exploded view.

Figure 40:
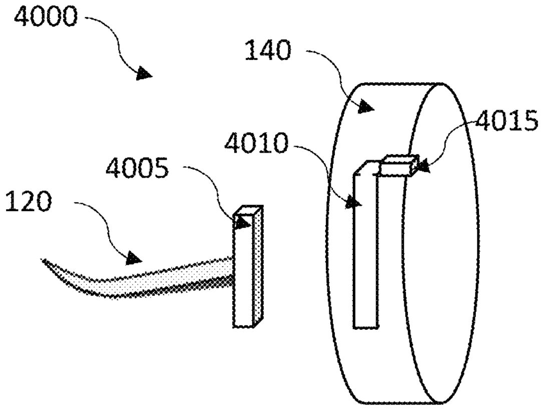
FIG. 40 depicts aspects of a tool including a removable shank, in accordance with the disclosed embodiments.

FIG. 40 illustrates another embodiment of a tool 4000. In the embodiment, the shank 120 can be configured to be removable from the grip 140, and/or can be interchangeable with other shanks. The shank 120 can include a mounting rod 4005, configured to slide into a mounting slot 4010. In certain embodiments, the mounting slip can have a lip with a width that is narrower than the width of the mounting rod, preventing the shank from being pulled out of the slot. A lock clip 4015 can be formed at the top of the mounting slot 4010. The lock clip 4015 must be removed in order for the shank 120 to be removed. It should be appreciated that the shank 120 can be embodied as any of those illustrated in FIGS. 4A-3G, such that the user can select the shank 120 to include on the grip 140.

Based on the foregoing, it can be appreciated that a number of embodiments, preferred and alternative, are disclosed herein. For example, in one embodiment, an apparatus comprises a shank comprising a connecting end and a pointed end adapted to penetrate a cranial cavity, a grip formed on the connecting end of the shank, and at least one finger loop connected to the grip. In an embodiment, the at least one finger loop further comprises two finger loops.

In an embodiment, the apparatus further comprises at least one support strut formed between the connecting end of the shank and the grip.

In an embodiment, the apparatus further comprises a choke wrench formed at an end of the grip. In another embodiment, the choke wrench comprises at least one choke step configured to interface with slots formed in a choke tube.

In an embodiment, the apparatus further comprises a curved region in the shank wherein the curved region in the shank is configured to allow the pointed end of the shank to penetrate a target below the target's cranial cavity and, upon continued insertion, penetrate a brain in the cranial cavity of the target thereby humanely dispatching the target. In an embodiment, the pointed end further comprises one of a left twist, a right twist, a loose corkscrew tip, a hook tip, a straight tip, a spiral tip, and a split-v tip.

In another embodiment, a system comprises a shank comprising a connecting end and a pointed end adapted to penetrate a cranial cavity, a grip formed on the connecting end of the shank, and at least one finger loop connected to the grip. In an embodiment, the at least one finger loop further comprises two finger loops. In an embodiment, the system further comprises at least one support strut formed between the connecting end of the shank and the grip.

In an embodiment, the system further comprises a choke wrench formed at an end of the grip. In an embodiment, the choke wrench comprises at least one choke step configured to interface with slots formed in a choke tube.

In an embodiment, the system further comprises a curved region in the shank wherein the curved region in the shank is configured to allow the pointed end of the shank to penetrate a target below the target's cranial cavity and, upon continued insertion, penetrate a brain in the cranial cavity of the target thereby humanely dispatching the target. In an embodiment, the pointed end further comprises one of a left twist, a right twist, a loose corkscrew tip, a hook tip, a straight tip, a spiral tip, and a split-v tip.

In yet another embodiment, an apparatus comprises a shank comprising a connecting end and a pointed end, a grip formed at the connecting end of the shank comprising a front surface and a rear surface, and a choke wrench formed along an edge of the grip.

In an embodiment, the choke wrench further comprises a curvature formed in the trailing edge of the grip. In another embodiment, the choke wrench further comprises at least one choke step formed in a rear end of the grip.

In an embodiment, the grip further comprises a sub-structure formed to connect to the connecting end of the shank. The sub-structure further comprises a cutout region comprising a flat wall and a lip formed on a side of the grip configured to open a bottle.

In another embodiment, the apparatus further comprises a curved region in the shank wherein the curved region in the shank is configured to allow the pointed end of the shank to penetrate a target below the target's cranial cavity and, upon continued insertion, penetrate a brain in the cranial cavity of the target thereby humanely dispatching the target.

In an embodiment, a system comprises a shank comprising a connecting end and a pointed end adapted to penetrate anatomy of wounded game, a grip formed on said connecting end of said shank, and at least one screwdriver head formed in a perimeter of the grip. In an embodiment, the system comprises a bottle opener formed in a perimeter of the grip. In an embodiment, the bottle opener further comprises a skinning slot. In an embodiment, a sharp interior edge is formed in the skinning slot. In an embodiment, the system comprises a curved region in said shank wherein said curved region in said shank is configured to allow said pointed end of said shank to penetrate a target below said target's cranial cavity and, upon continued insertion, penetrate a brain in said cranial cavity of said target thereby humanely dispatching said target. In an embodiment, said pointed end further comprises one of: a left twist; a right twist; a loose corkscrew tip; a hook tip; a straight tip; a spiral tip; and a split-v tip.

In another embodiment, a tool comprises a shank having a connecting end and a pointed end, a grip connected to said connecting end of said shank, and a bottle opener formed in a perimeter of the grip. In an embodiment, a tool comprises a choke wrench formed at an end of said grip. In an embodiment, a tool comprises at least one choke step configured to interface with slots formed in a choke tube. In an embodiment, a tool comprises a curved region in said shank wherein said curved region in said shank is configured to allow said pointed end of said shank to penetrate a target below said target's cranial cavity and, upon continued insertion, penetrate said target's cranial cavity thereby humanely dispatching said target. In an embodiment, the tool comprises a utility point formed in the perimeter of the grip. In an embodiment a pointed end further comprises one of: a left twist; a right twist; a loose corkscrew tip; a hook tip; a straight tip; a spiral tip; and a split-v tip. In an embodiment, a tool comprises a lip formed on the grip.

In an embodiment, a system comprises a shank comprising a connecting end and a pointed end, a grip formed on said connecting end of said shank, and a lanyard, connected to a hole in said grip. In an embodiment, the system further comprises a choke wrench formed at an end of said grip. In an embodiment, the shank is tapered toward said pointed end. In an embodiment, the system further comprises a file surface formed in said grip. In an embodiment, the system further comprises a flint surface formed in said grip. In an embodiment, the system further comprises a utility point formed in the perimeter of the grip. In an embodiment, the system further comprises a bottle opener formed in a perimeter of the grip.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system comprising:

a shank comprising a connecting end and a pointed end, the shank comprising a tubular shape tapering in width from the connecting end to the pointed end, wherein the pointed end terminates in a point adapted to penetrate a cranial cavity;

a thumb grip formed on said connecting end of said shank; and a single finger loop, the single finger loop being connected to a bottom of said thumb grip.

2. The system of claim 1 further comprising:

a first support strut connecting a side of the connecting end of said shank and front surface of said thumb grip; and a second support strut connecting another side of the connecting end of said shank and front surface of said thumb grip.

3. The system of claim 1 further comprising:

a curved region in said shank.

4. The system of claim 1 wherein said pointed end further comprises a hook tip.

5. A tool comprising:

a shank having a connecting end and a pointed end;

a thumb grip connected to said connecting end of said shank;

a plurality of ridges formed on a top surface of said thumb grip; and a single finger loop connected to a bottom surface of said thumb grip.

6. The tool of claim 5 further comprising:

a first support strut connecting a side of the connecting end of said shank and front surface of said thumb grip; and a second support strut connecting another side of the connecting end of said shank and front surface of said thumb grip.

7. The tool of claim 6 further comprising:

a thickened support formed axial along the top surface of the thumb grip and along a portion of the shank.

8. The tool of claim 5 further comprising:

a curved region in said shank.

9. The tool of claim 5 wherein the shank is straight and the pointed end further comprises a straight tip.

10. The tool of claim 5 further comprising:

a lip formed on the thumb grip at an intersection between the thumb grip and the shank.

* * * * *